United States Patent
Han et al.

(10) Patent No.: US 11,153,055 B2
(45) Date of Patent: Oct. 19, 2021

(54) CSI-RS MEASUREMENT METHOD AND INDICATION METHOD, NETWORK DEVICE, AND TERMINAL

(71) Applicant: HUAWEI TECHNOLOGIES CO., LTD., Guangdong (CN)

(72) Inventors: Wei Han, Shanghai (CN); Jinyao Liang, Shenzhen (CN); Ruiqi Zhang, Beijing (CN); Ting Wang, Shanghai (CN); Huangping Jin, Shanghai (CN); Shengyue Dou, Shanghai (CN); Yuanjie Li, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/568,681

(22) Filed: Sep. 12, 2019

(65) Prior Publication Data

US 2020/0007299 A1 Jan. 2, 2020

Related U.S. Application Data

(63) Continuation of application No. PCT/CN2018/092380, filed on Jun. 22, 2018.

(30) Foreign Application Priority Data

Nov. 17, 2017 (CN) .......................... 201711147992.0

(51) Int. Cl.
*H04L 5/00* (2006.01)
*H04B 17/309* (2015.01)
*H04W 72/04* (2009.01)

(52) U.S. Cl.
CPC ......... *H04L 5/0057* (2013.01); *H04B 17/309* (2015.01); *H04W 72/042* (2013.01)

(58) Field of Classification Search
CPC .. H04W 72/04; H04W 72/042; H04L 5/0057; H04B 17/309
See application file for complete search history.

(56) References Cited

U.S. PATENT DOCUMENTS 9,793,970 B2 10/2017 Guo et al.
2011/0273977 A1* 11/2011 Shapira ................ H04B 7/0617
370/208

(Continued)

FOREIGN PATENT DOCUMENTS

| CA | 2863061 C | 1/2017 |
| CN | 102684835 A | 9/2012 |

(Continued)

OTHER PUBLICATIONS

Ericsson et al., "RI and PMI sharing between multiple CSI processes," 3GPP TSG-RAN WG1 #69, R1-122836; Prague, Czech Republic, May 21-30, 2012, 6 pages.

(Continued)

*Primary Examiner* — Chi Ho A Lee
(74) *Attorney, Agent, or Firm* — Fish & Richardson P.C.

(57) ABSTRACT

One example method for measuring a channel state information reference signal includes receiving, from a network device, a partial channel state information reference signal resource sets selected from a plurality of channel state information reference signal resource sets and indication information indicating one or more resource sets for channel measurement, which are from the partial channel state information reference signal resource sets, and performing channel measurement by using the one of the one or more resource sets for channel measurement indicated by the indication information.

30 Claims, 8 Drawing Sheets

(56) References Cited

U.S. PATENT DOCUMENTS

| | | | |
|---|---|---|---|
| 2012/0281567 A1 | 11/2012 | Gao et al. | |
| 2013/0034000 A1* | 2/2013 | Huo | H04W 72/0466 |
| | | | 370/252 |
| 2013/0301450 A1 | 11/2013 | Geirhofer et al. | |
| 2014/0044040 A1 | 2/2014 | Chen et al. | |
| 2015/0049621 A1 | 2/2015 | Liu et al. | |
| 2015/0071368 A1* | 3/2015 | Lau | H04B 7/0639 |
| | | | 375/267 |
| 2015/0124726 A1 | 5/2015 | Ni et al. | |
| 2015/0131563 A1 | 5/2015 | Guo et al. | |
| 2016/0174235 A1 | 6/2016 | Fong et al. | |
| 2016/0262029 A1 | 9/2016 | Zhao et al. | |
| 2016/0301505 A1 | 10/2016 | Furuskog et al. | |
| 2017/0294950 A1* | 10/2017 | Kim | H04B 7/0626 |
| 2018/0102817 A1* | 4/2018 | Park | H04B 7/06 |
| 2018/0287765 A1* | 10/2018 | Lee | H04L 5/1469 |
| 2019/0115963 A1* | 4/2019 | Zhu | H04B 7/0626 |
| 2019/0141559 A1* | 5/2019 | Tang | H04W 24/10 |
| 2020/0067584 A1* | 2/2020 | Kang | H04W 72/0413 |
| 2020/0153352 A1* | 5/2020 | Wang | H02M 1/08 |
| 2020/0153552 A1* | 5/2020 | Zhang | H04W 76/27 |

FOREIGN PATENT DOCUMENTS

| | | |
|---|---|---|
| CN | 102754458 A | 10/2012 |
| CN | 102801498 A | 11/2012 |
| CN | 103503330 A | 1/2014 |
| CN | 103580819 A | 2/2014 |
| CN | 104619027 A | 5/2015 |
| CN | 106797649 A | 5/2017 |
| EP | 3026954 A1 | 6/2016 |

OTHER PUBLICATIONS

ZTE et al., "Offline Summary of CSI measurement," 3GPP TSG RAN WG1 Meeting #90bis, R1-1719005; Prague, CZ, Oct. 9-13, 2017, 6 pages.

3GPP TS 36.331 V14.4.0 (Sep. 2017),"3rd Generation Partnership Project;Technical Specification Group Radio Access Network; Evolved Universal Terrestrial Radio Access (E-UTRA); Radio Resource Control (RRC); Protocol specification (Release 14)," Sep. 2017, 753 pages.

3GPP TS 36.213 V14.4.0 (Sep. 2017), "3rd Generation Partnership Project; Technical Specification Group Radio Access Network; Evolved Universal Terrestrial Radio Access (E-UTRA); Physical layer procedures (Release 14)," Sep. 2017, 462 pages.

3GPP TS 38.331 V0.1.0 (Oct. 2017), 3rd Generation Partnership Project; Technical Specification Group Radio Access Network; NR;Radio Resource Control (RRC); Protocol specification (Release 15), Oct. 2017, 42 pages.

3GPP TS 38.214 V1.0.0 (Sep. 2017),"3rd Generation Partnership Project;Technical Specification Group Radio Access Network; NR; Physical layer procedures for data (Release 15)," Sep. 2017, 32 pages.

Extended European Search Report issued in European Application No. 18878932.5 dated Dec. 11, 2019, 10 pages.

Office Action issued in Chinese Application No. 201810277603.4 dated Dec. 4, 2018, 6 pages.

Office Action issued in Chinese Application No. 201810733552.1 dated Sep. 19, 2019, 6 pages (with English translation).

Office Action issued in Chinese Application No. 201810733552.1 dated Mar. 27, 2019, 15 pages (with English translation).

Office Action issued in Chinese Application No. 201810733552.1 dated Jun. 10, 2016, 19 pages (with English translation).

PCT International Search Report and Written Opinion issued in International Application No. PCT/CN2018/092380 dated Sep. 4, 2018, 12 pages (partial English translation).

Office Action issued in Canadian Application No. 3053206 dated Sep. 29, 2020, 9 pages.

Ericsson, "RRC configuration for beam management in NR," 3GPP TSG-RAN WG2 Meeting #99bis, R2-1711341, Prague, Czech Republic, Oct. 9-13, 6 pages.

Huawei, HiSilicon, "CSI acquisition details for hybrid CSI," 3GPP TSG RAN WG1 Meeting #90bis, R1-1718243, Prague, Czech Republic, Oct. 9-13, 2017, 5 pages.

Office Action issued in Japanese Application No. 2019-548279 dated Oct. 5, 2020, 9 pages (with English translation).

* cited by examiner

CSI-RS MEASUREMENT METHOD AND INDICATION METHOD, NETWORK DEVICE, AND TERMINAL

CROSS-REFERENCE TO RELATED APPLICATIONS

This application is a continuation of International Application No. PCT/CN2018/092380, filed on Jun. 22, 2018, which claims priority to Chinese Patent Application No. 201711147992.0, filed on Nov. 17, 2017. The disclosures of the aforementioned applications are hereby incorporated by reference in their entireties.

TECHNICAL FIELD

This application relates to the communications field, and in particular, to a channel state information reference signal measurement indication method, a channel state information reference signal measurement method, a network device, and a terminal.

BACKGROUND

In a coordinated multipoint transmission/reception scenario of a plurality of base stations, a plurality of channel and interference measurement resources need to be configured on a network side. A terminal device side needs to perform measurement and feed back channel state information (CSI) in one or more interference cases, so that the network side properly determines, based on a plurality of pieces of CSI, a transmission solution of the coordinated multipoint transmission/reception scenario of a plurality of base stations, a corresponding link adaptation configuration, and a scheduling policy.

In Long Term Evolution (LTE), one or more channel state information processes (CSI process) may be configured for one user equipment (UE). Each CSI process includes CSI reporting (report) information, channel measurement resource (CMR) information, interference measurement resource (IMR) information, and the like. A channel measurement resource is a non-zero power channel state information reference signal resource (NZP CSI-RS resource), and an interference measurement resource is a zero power channel state information reference signal resource (ZP CSI-RS resource). When a CSI process includes $K \geq 1$ CMRs, K IMRs need to be configured. One NZP CMR and one ZP IMR are in a one-to-one correspondence, and jointly constitute one (channel and interference) measurement hypothesis condition.

A problem of the foregoing technical solution is as follows: Each measurement hypothesis condition includes only one NZP CMR and one ZP IMR, and cannot effectively support multi-user interference measurement.

SUMMARY

In embodiments of this application, for a CSI-RS resource-related configuration and indication problem, corresponding configuration and indication technologies are designed to resolve the foregoing technical problem. Specifically, a channel state information reference signal measurement indication method, a channel state information reference signal measurement method based on the indication method, a corresponding network device, and a corresponding terminal are provided.

According to a first aspect, an embodiment of this application provides a channel state information reference signal measurement indication method, including configuring, by a network device, channel state information reference signal resources as a resource set used for channel measurement and a resource set used for interference measurement, where the resource set used for channel measurement, namely, a resource set consisting of resources used for channel measurement, includes one or more non-zero power channel state information reference signal resources; the resource set used for interference measurement, namely, a resource set consisting of resources used for interference measurement, includes at least one of a non-zero power channel state information reference signal resource and a zero power channel state information reference signal resource.

It should be noted that, for ease of differentiation in the following solution descriptions, from a function perspective, the resource set consisting of resources used for channel measurement is referred to as a channel measurement resource set (channel measurement resource set, CMR resource set for short), and the resource set consisting of resources used for interference measurement is referred to as an interference measurement resource set (interference measurement resource set, IMR resource set for short). The CMR resource set and the IMR resource set may be used for description subsequently, but meanings of the CMR resource set and the IMR resource set are not limited. In other words, the CMR resource set in this specification is a CSI-RS resource set used for channel measurement, and the IMR resource set is a CSI-RS resource set used for interference measurement.

In addition, if a CSI-RS resource set includes both an NZP CSI-RS resource used for channel measurement and an NZP CSI-RS resource used for interference measurement, the resource set is described as a CSI-RS resource set subsequently.

The network device sends reference signal measurement indication information to a terminal, where the indication information is used to indicate, to the terminal, the resource set used for channel measurement.

Correspondingly, an embodiment of this application provides a network device, including:

a processor, configured to configure a resource set used for channel measurement and a resource set used for interference measurement in a channel state information reference signal resource set, where the resource set used for channel measurement includes one or more non-zero power channel state information reference signal resources, and the resource set used for interference measurement includes at least one of a non-zero power channel state information reference signal resource and a zero power channel state information reference signal resource; and a transceiver, configured to send a reference signal measurement indication information to a terminal, where the indication information is used to indicate, to the terminal, the resource set used for channel measurement.

An embodiment of this application further provides a channel state information reference signal measurement method, including:

receiving reference signal measurement indication information sent by a network device, where the indication information is used to indicate a resource set used for channel measurement, and the resource set used for channel measurement includes one or more non-zero power channel state information reference signal resources; and performing channel measurement by using the non-zero power channel state information reference signal resource in the resource set used for channel measurement and indicated by the indication information.

Correspondingly, an embodiment of this application provides a terminal, including:

a transceiver, configured to receive reference signal measurement indication information sent by a network device, where the indication information is used to indicate a resource set used for channel measurement, and the resource set used for channel measurement includes one or more non-zero power channel state information reference signal resources; and a processor, configured to perform channel measurement by using the non-zero power channel state information reference signal resource in the resource set used for channel measurement and indicated by the indication information.

In the embodiments of this application, the resource set used for channel measurement is referred as a CMR resource set, and it indicates that an NZP CSI-RS resource included in the CSI-RS resource set is used for channel measurement. The resource set used for interference measurement is referred to as an IMR resource set, and it indicates that either or both of an NZP CSI-RS resource and a ZP CSI-RS resource included in the CSI-RS resource set is used for interference measurement.

During implementation of the channel state information reference signal measurement indication method provided in the first aspect, there may be a correspondence between the CMR resource set and the IMR resource set that is configured by the network device. Alternatively, there may be no correspondence between the CMR resource set and the IMR resource set. In other words, there may be a flexible collocation relationship between the CMR resource set and the IMR resource set.

There is a correspondence between the CMR resource set and the IMR resource set. In other words, the CMR resource set may be in a fixed one-to-one collocation relationship with the IMR resource set, or a quantity of CMR resource sets is the same as a quantity of IMR resource sets. In this configuration manner, the network device notifies, by using first signaling, the terminal device of the CMR resource set and the IMR resource set that are configured by the network device, and the correspondence between the CMR resource set and the IMR resource set. Then, the network device sends indication information to the terminal, and the indication information is used to indicate the resource set used for channel measurement and a channel state information reporting setting identifier (ID). Because there is a correspondence between the CMR resource set and the IMR resource set, the network device does not need to additionally indicate, to the terminal, the resource set used for interference measurement. After receiving the indicated resource set used for channel measurement, the terminal device can obtain a resource set that is used for interference measurement and corresponding to the resource set used for channel measurement. After performing channel measurement and interference measurement according to the indication, the terminal device performs CSI reporting according to the CSI reporting setting ID indicated by the indication information.

When the CMR resource set and the IMR resource set are not in a fixed one-to-one collocation relationship, in this configuration manner, the network device notifies, by using first signaling, the terminal device of the CMR resource set and the IMR resource set that are configured by the network device. Then, the network device sends indication information to the terminal, and the indication information is used to indicate the resource set used for channel measurement, the resource set used for interference measurement, and a channel state information reporting setting identifier (CSI reporting setting ID). After receiving the indicated resource set used for channel measurement and the indicated resource set used for interference measurement, the terminal device performs channel measurement and interference measurement according to the indication, and then performs CSI reporting by using the CSI reporting setting ID indicated by the indication information.

In another implementation, in the method provided in this embodiment of this application, during configuration of the CMR resource set and the IMR resource set, a predefined interference hypothesis condition is further considered. In other words, the network device configures that CMR resource sets and IMR resource sets constitute several channel and interference measurement hypothesis conditions. Each channel and interference measurement hypothesis condition is corresponding to one channel measurement resource set (including one or more CMRs) and one interference measurement resource set (including one or more NZP IMRs and one or more ZP IMRs). In this configuration manner, the network device sends the configuration manner to the terminal by using first signaling, and sends indication information to the terminal. The indication information is used to indicate the channel and interference hypothesis condition (Measurement hypothesis) and a channel state information reporting setting identifier. After receiving the indicated channel and interference hypothesis condition, the terminal device can obtain the resource set used for channel measurement and the resource set used for interference measurement, performs channel measurement and interference measurement, and then performs CSI reporting by using the CSI reporting setting ID indicated by the indication information.

In the foregoing several implementations, the network device sends the first signaling to the terminal to indicate configuration made by the network device. Usually, the first signaling is carried by using higher layer signaling such as radio resource control (RRC) or a MAC control element (MAC CE).

The network device sends the indication information to the terminal. Content indicated by the indication information, for example, one or more pieces of information in the CMR resource set, the IMR resource set, the CSI reporting setting ID, and the measurement hypothesis, may be indicated by using a second signaling, namely, by using a joint field indication, or may be indicated by using several fields, namely, by using separate fields. In other words, the content is indicated by using the second signaling, third signaling, or even more signaling. The indication information herein may be carried by using higher layer signaling such as a MAC control element (MAC CE) or downlink control information (DCI).

A length of a DCI field used for carrying the indication information depends on a quantity of resources configured by the RRC or a quantity of resource sets, or is a fixed value. In addition, a quantity of DCI fields depends on a configuration of the network device or a predefined rule. The network device configures the CMR resource set and the IMR resource set for the terminal, supports flexible configuration of the NZP IMR and the ZP IMR, and can meet various CMR and IMR measurement requirements, so as to ensure reporting quality of CSI information such as a CQI on the terminal side.

The network device configures channel state information reference signal resources based on a granularity of a resource set, and configures the channel state information reference signal resources as the resource set used for channel measurement and the resource set used for interference measurement. According to a second aspect of the embodiments of this application, for a channel state information reference signal resource, a network device may further configure that a resource of a channel state information reference signal resource set can be used for both channel measurement and interference measurement. The resource used for channel measurement includes one or more non-zero power channel state information reference signal resources. The resource used for interference measurement includes at least one of a non-zero power channel state information reference signal resource and a zero power channel state information reference signal resource. In other words, an NZP CMR and an NZP IMR may be configured in one CSI-RS resource set instead of different CSI-RS resource sets. This method is more flexible and can satisfy different application scenarios.

Correspondingly, an embodiment of this application provides a network device, including:

a processor, configured to configure that a channel state information reference signal resource set includes a resource used for channel measurement and a resource used for interference measurement, where the resource used for channel measurement includes one or more non-zero power channel state information reference signal resources, and the resource used for interference measurement includes at least one of a non-zero power channel state information reference signal resource and a zero power channel state information reference signal resource; and a transceiver, configured to send reference signal measurement indication information to a terminal, where the indication information is used to indicate, to the terminal, at least one of the resource used for channel measurement or the resource used for interference measurement in the channel state information reference signal resource set.

Correspondingly, an embodiment of this application provides a channel state information reference signal measurement method, including:

receiving reference signal measurement indication information sent by a network device, wherein the indication information is used to indicate a resource used for channel measurement, and the resource used for channel measurement is one or more non-zero power channel state information reference signal resources; and performing channel measurement by using the resource used for channel measurement and indicated by the indication information.

Correspondingly, an embodiment of this application further provides a terminal, including:

a transceiver, configured to receive reference signal measurement indication information sent by a network device, where the indication information is used to indicate a resource used for channel measurement, and the resource used for channel measurement is one or more non-zero power channel state information reference signal resources; and a processor, configured to perform channel measurement by using the resource used for channel measurement and indicated by the indication information.

In this embodiment of this application, in the channel state information reference signal resource set, the resource used for channel measurement is totally different from, partially the same as, or completely the same as the resource used for interference measurement. In other words, in a CSI-RS resource set, a CMR resource used for channel measurement may be completely or partially the same as an IMR resource used for interference measurement.

In this configuration manner, a CMR resource and an IMR resource in a CSI-RS resource set may be in different collocation manners. Different collocation manners may be corresponding to different CSI reports.

Likewise, the network device may further configure, based on a channel and interference measurement hypothesis condition, which resource in the CSI-RS resource set is used as a CMR resource and which resource in the CSI-RS resource set is used as an IMR resource. Specifically, the network device first configures at least one channel and interference hypothesis condition, and each channel and interference hypothesis condition is corresponding to one channel measurement resource and one interference measurement resource.

Similarly, the network device sends a first signaling to the terminal to indicate configuration made by the network device on the CSI-RS resource set, and specifically, to indicate which resource is configured as a CMR resource and which resource is configured as an IMR resource. Usually, the first signaling is carried by using higher layer signaling such as radio resource control (radio resource control, RRC) or a MAC control element (MAC CE).

The network device sends the indication information to the terminal. Content indicated by the indication information, for example, one or more pieces of information in the CMR resource, the IMR resource, a CSI reporting setting ID, and the measurement hypothesis, may be indicated by using a second signaling, namely, by using a joint field (joint field), or may be indicated by using several fields, namely, by using separate fields (separate field). In other words, the content is indicated by using the second signaling, third signaling, or even more signaling. The indication information herein may be carried by using higher layer signaling such as a MAC control element (MAC CE) or downlink control information (DCI).

Likewise, a length of a DCI field used for carrying the indication information depends on a quantity of resources configured by the RRC or a quantity of resource sets, or is a fixed value. In addition, a quantity of DCI fields depends on a configuration of the network device or a predefined rule.

A beneficial effect of this method is to support flexible configuration and indicating of the CMR and the IMR when an NZP CMR and an NZP IMR are configured in a same resource set. Because specific application scenarios have different interference conditions, a network side can meet various measurement requirements of CMR and IMR by using the foregoing configuration and indication method, so as to ensure reporting quality of CSI information such as a CQI.

When there are at least two channel state information reference signal resource settings (CSI-RS resource setting), the indication information further includes a link identifier (Link ID) to distinguish between the resource used for channel measurement and the resource used for interference measurement. Alternatively, the indication information further includes a resource setting identifier (ID) to distinguish between the resource used for channel measurement and the resource used for interference measurement.

To further reduce configuration and indication overheads of the network device, before the network device configures channel state information reference signal resources as a resource set used for channel measurement and a resource set used for interference measurement, or configures that a channel state information reference signal resource set includes a resource used for channel measurement and a resource used for interference measurement, the method provided in this embodiment of this application further includes the following:

The network device sends, to the terminal, some channel state information reference signal resource sets that are selected from a plurality of channel state information reference signal resource sets and that are used for channel state information measurement, and some channel state information reporting settings that are selected from a plurality of channel state information reporting settings and that are used for channel state information reporting.

Then, the network device sends, to the terminal, second indication information that is used to indicate the selected channel state information reference signal resource sets and the selected channel state information reporting settings.

In an implementation, the network device configures that there is a correspondence between the CMR resource set and the IMR resource set. The network device first configures M combinations of a CSI reporting setting and a CSI-RS resource set, and then selects $N_{ps}$ combinations of a CSI reporting setting and a CSI-RS resource set from the M combinations of a CSI reporting setting and a CSI-RS resource set, where $N_{ps} \leq M$. In this case, the network device sends second indication information to the terminal to indicate the selected $N_{ps}$ combinations of a CSI reporting setting and a CSI-RS resource set. Specifically, $\lceil \log N_{ps} \rceil$ bits may be used to indicate selecting of one combination from the selected $N_{ps}$ combinations of a CSI reporting setting and a CSI-RS resource set. Specifically, a correspondence between a CMR resource set and an IMR resource set in the CSI-RS resource set is indicated by using the first signaling. In addition, the terminal may learn of a corresponding IMR resource set according to a CMR resource set indicated by the indication information.

In another implementation, the network device first selects $N_p$ CSI reporting settings from N CSI reporting settings, where $N_p \leq N$. The network device selects $N_s$ CSI-RS resource sets from S CSI-RS resource sets, where $N_s \leq S$. Then, the terminal is instructed, by using $\lceil \log N_p \rceil$ bits, to select one setting from the selected $N_p$ CSI reporting settings, and the terminal is instructed, by using $\lceil \log N_s \rceil$ bits, to select one set from the selected $N_s$ CSI-RS resource sets. The network device may further adjust $\lceil \log N_p \rceil$ and/or $\lceil \log N_s \rceil$ or adjust $N_p$ and/or $N_s$, to allocate indication overheads between the CSI reporting settings and the CSI-RS resource sets. In particular, when the CSI reporting setting or the CSI-RS resource set is unique, an indication bit may not be allocated.

In an implementation in which the network device does not configure that there is a correspondence between the CMR resource set and the IMR resource set, namely, the CMR resource set is in flexible collocation with the IMR resource set, the network device first configures M combinations of a CSI reporting setting, a CMR resource set, and an IMR resource set, and then selects $N_{ps}$ combinations of a CSI reporting setting, a CMR resource set, and an IMR resource set from the M combinations, where $N_{ps} \leq M$. In this case, the network device sends second indication information to the terminal to indicate the selected $N_{ps}$ combinations of a CSI reporting setting, a CMR resource set, and an IMR resource set. Specifically, $\lceil \log N_{ps} \rceil$ bits may be used to indicate selecting of one combination from the selected $N_{ps}$ combinations. Specifically, based on the CMR resource set and the IMR resource set that are indicated by the indication information, the terminal may learn of a corresponding CMR resource set and a corresponding IMR resource set.

In still another implementation, the network device first selects $N_p$ CSI reporting settings from N CSI reporting settings, where $N_p \leq N$. The network device selects $N_{s_1}$ CSI-RS resource sets from $S_1$ CSI-RS resource sets for channel measurement, where $N_{s_1} \leq S_1$. The network device selects $N_{s_2}$ CSI-RS resource sets from $S_2$ CSI-RS resource sets for interference measurement, where $N_{s_2} \leq S_2$. Then, the terminal is instructed, by using $\lceil \log N_p \rceil$ bits, to select one setting from the selected $N_p$ CSI reporting settings, the terminal is instructed, by using $\lceil \log N_{s_1} \rceil$ bits, to select one resource set from the selected $N_{s_1}$ CSI-RS resource sets used for channel measurement, and the terminal is instructed, by using $\lceil \log N_{s_2} \rceil$ bits, to select one resource set from the selected $N_{s_2}$ CSI-RS resource sets used for interference measurement.

The network device may further adjust $\lceil \log N_p \rceil$ and/or $\lceil \log N_{s_1} \rceil$ or $\lceil \log N_{s_2} \rceil$, or adjust $N_p$ and/or $N_{s_1}$ or $N_{s_2}$ and allocate indication overheads between the CSI reporting setting and the CSI-RS resource set used for channel measurement or the CSI-RS resource set used for interference measurement. In particular, when the CSI reporting setting or the CMR resource set or the IMR resource set is unique, an indication bit may not be allocated.

In still another implementation, based on configuring a channel and interference measurement hypothesis condition, the network device may select a plurality of combinations from a plurality of combinations of a channel and interference measurement hypothesis condition and a CSI-RS reporting setting in the foregoing manner, and configure the plurality of combinations for the terminal. The selected combinations of a channel and interference measurement hypothesis condition and a CSI-RS reporting setting, or further information such as a CMR resource set and/or an IMR resource set may be indicated to the terminal by using a similar joint field indication or a separate field indication.

The foregoing M, N, $N_{ps}$, $N_s$, $N_{s_1}$, $N_{s_2}$, and $N_p$ are natural numbers greater than or equal to 1.

In addition, for an implementation in which both a CMR resource and an IMR resource are configured in a CSI-RS resource set, the CSI-RS resource set may also be first selected and then indicated by using corresponding second indication information.

In the foregoing selection method, indication overheads can be reduced, and indication overheads can be flexibly allocated. Because specific application scenarios have different interference conditions, a network side can meet different CMR and IMR measurement requirements by using the foregoing configuration and indication method, so as to ensure reporting quality of CSI information such as a CQI.

The network device provided in this embodiment of this application may be a base station or a control node.

According to another aspect, an embodiment of this application provides a base station, where the base station has functions of implementing base station behavior in the foregoing method design. The functions may be implemented by using hardware, or may be implemented by executing corresponding software by hardware. The hardware or the software includes one or more modules corresponding to the functions.

In a possible design, a structure of the base station includes a processor and a transceiver, where the processor is configured to support the base station in performing corresponding functions in the foregoing method. The transceiver is configured to support communication between the base station and UE, send information or signaling used in the foregoing method to the UE, and receive information or an instruction sent by the base station. The base station may further include a memory, where the memory is configured to couple to the processor and store a program instruction and data that are necessary for the base station.

A terminal provided in an embodiment of this application has functions of implementing terminal behavior in the foregoing method design. The functions may be implemented by hardware, and a structure of the terminal includes a transceiver and a processor. Alternatively, the functions may be implemented by executing corresponding software by hardware. The hardware or the software includes one or more modules corresponding to the functions. The modules may be software and/or hardware.

According to still another aspect, an embodiment of this application provides a control node that may include a controller/processor, a memory, and a communications unit. The controller/processor may be configured to coordinate resource management and configuration between a plurality of base stations, and may be configured to perform the method described in the foregoing embodiment. The memory may be configured to store program code and data of the control node. The communications unit is configured to support communication between the control node and a base station, for example, send information about a configured resource to the base station.

According to still another aspect, an embodiment of this application provides a communications system, and the system includes the base station and the terminal that are described in the foregoing aspects. Optionally, the communications system may further include the control node in the foregoing embodiments.

According to yet another aspect, an embodiment of this application provides a computer storage medium, configured to store a computer software instruction used by the foregoing base station, including a program designed to execute the foregoing aspects.

According to yet another aspect, an embodiment of this application provides a computer storage medium, configured to store a computer software instruction used by the foregoing terminal, including a program designed to execute the foregoing aspects.

According to yet another aspect, an embodiment of this application further provides a processing apparatus, including a processor and an interface, where the processor is configured to configure CSI-RS resources as a resource set used for channel measurement and a resource set used for interference measurement, and provide a plurality of correspondences between the resource set used for channel measurement and the resource set used for interference measurement. In another implementation, for a CSI-RS resource set, the network device configures that resources in the CSI-RS resource set include both a resource used for channel measurement and a resource used for interference measurement; and the processor is further configured to send a reference signal measurement indication information to a terminal by using the interface, to indicate the resource set used for channel measurement or which resource is a resource used for channel measurement and which resource is a resource used for interference measurement in a set.

Alternatively, the processor is configured to receive, by using the interface, a reference signal measurement indication information sent by the network device, where the indication information is used to indicate a resource set used for channel measurement, and the resource set used for channel measurement includes one or more non-zero power channel state information reference signal resources; or the indication information is used to indicate a resource used for channel measurement, and the resource used for channel measurement is one or more non-zero power channel state information reference signal resources; and the processor is configured to perform channel measurement by using the non-zero power channel state information reference signal resource in the resource set used for channel measurement and indicated by the indication information; or perform channel measurement by using the resource used for channel measurement and indicated by the indication information.

The processing apparatus may be a chip. The processor may be implemented by using hardware or software. When the processor is implemented by using the hardware, the processor may be a logic circuit, an integrated circuit, or the like; or when the processor is implemented by using the software, the processor may be a general-purpose processor, and is implemented by reading software code stored in a memory. The memory may be integrated into the processor, and may be located outside the processor and exist independently.

In this application, for the CSI-RS resource-related configuration and indication problem, corresponding configuration and indication technologies are designed and include the following: The network device configures the CSI-RS resources as the resource set used for channel measurement and the resource set used for interference measurement, and provides a plurality of correspondences between the resource set used for channel measurement and the resource set used for interference measurement. In another implementation, for a CSI-RS resource set, the network device configures that resources in the CSI-RS resource set include both the resource used for channel measurement and the resource used for interference measurement. The network device sends the reference signal measurement indication information to the terminal to indicate the resource set used for channel measurement or which resource is used for channel measurement and which resource is used for interference measurement in a set. In this way, the network device performs flexible and diverse configuration on the CSI-RS resource, and reduces indication overheads as many as possible, thereby meeting a requirement of channel and interference measurement performed by a plurality of user terminals in an NR system.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1:
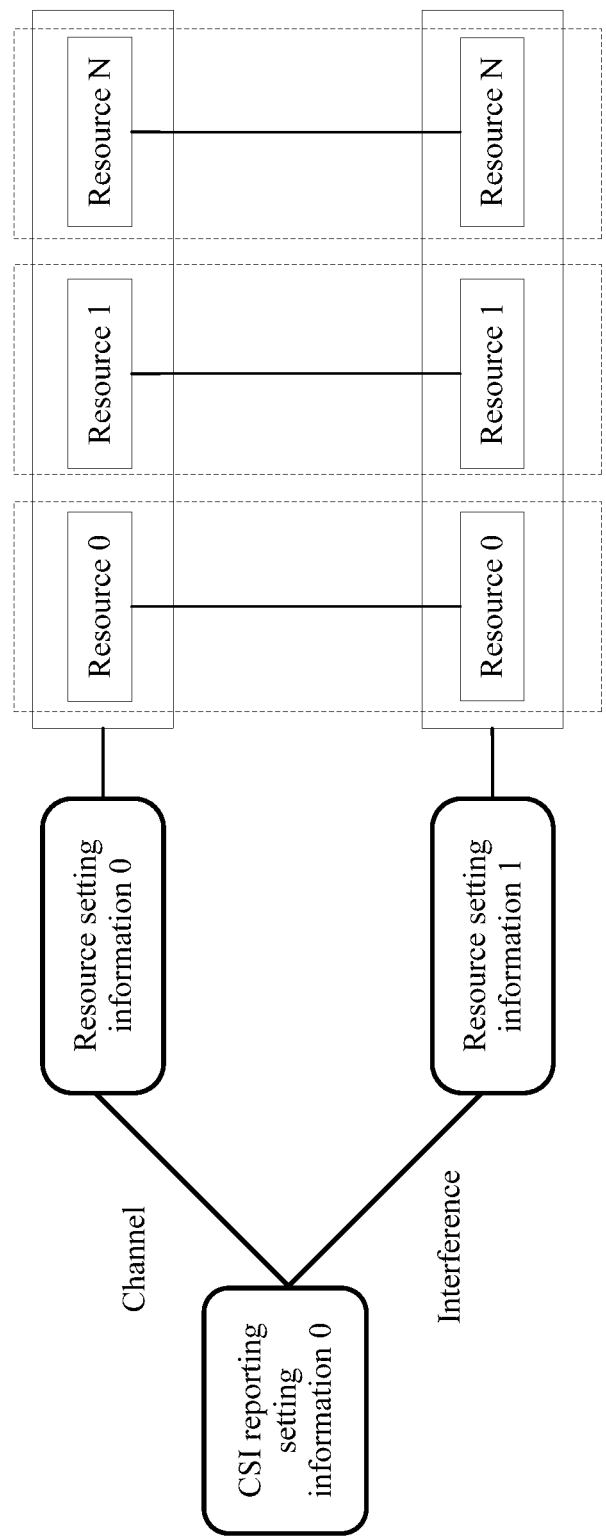
FIG. 1 is a schematic diagram of configuration for channel state information reference signal measurement in the prior art.

Embodiments of the present invention may be applied to a wireless communications system. The wireless communications system generally includes cells, and each cell includes one base station (BS). The base station provides a communications service for a plurality of terminal devices. The base station includes a baseband unit (BBU) and a remote radio unit (RRU). The BBU and the RRU may be disposed at different places. For example, the RRU is remote and disposed in an open area relatively near to heavy traffic, and the BBU is disposed in a central equipment room. Alternatively, the BBU and the RRU may be disposed in a same equipment room. Alternatively, the BBU and the RRU may be different components in one rack.

It should be noted that the wireless communications system in the embodiments of the present invention includes but is not limited to: a Narrowband Internet of Things (NB-IoT), a Global System for Mobile Communications (GSM), an Enhanced Data rate for GSM Evolution (EDGE) system, a Wideband Code Division Multiple Access (WCDMA) system, a Code Division Multiple Access 2000 (CDMA 2000) system, a Time Division-Synchronous Code Division Multiple Access (TD-SCDMA) system, a Long Term Evolution (LTE) system, an NR system, and a future mobile communications system.

In the embodiments of the present invention, the base station is an apparatus that is deployed in a radio access network and that is configured to provide a wireless communication function for a terminal device. The base station may include a macro base station, a micro base station (also referred to as a small cell), a relay node, an access point, a TRP, and the like in various forms. In systems that use different radio access technologies, names of devices that have a base station function may be different. For example, in the LTE system, the device is referred to as an evolved NodeB (evolved NodeB, eNB or eNodeB), and in a $3^{rd}$ generation (3G) system, the device is referred to as a NodeB (NB). For ease of description, in all the embodiments of the present invention, all the apparatuses that provide a wireless communication function for the terminal device are collectively referred to as a network device.

The terminal device in the embodiments of the present invention may include various handheld devices, in-vehicle devices, wearable devices, or computing devices that have a wireless communication function, or other processing devices connected to a wireless modem. The terminal device may also be referred to as a mobile station (MS), a terminal, or may include a subscriber unit, a cellular phone, a smartphone, a wireless data card, a personal digital assistant (PDA) computer, a tablet computer, a wireless modem, a handset (handset), a laptop computer, a machine type communication (MTC) terminal, and the like. For ease of description, the devices mentioned above are collectively referred to as a terminal device in all the embodiments of the present invention.

In LTE, a network side configures one CSI process for one interference measurement hypothesis condition. When a quantity of coordinated base stations increases, interference measurement hypothesis conditions also increase, and consequently, a quantity of CSI processes that need to be configured increases, and a system is not scalable. One CSI process includes one non-zero power channel state information reference signal NZP CSI-RS resource used for channel measurement and one ZP CSI-RS resource used for interference measurement. When interference measurement hypothesis conditions increase, more ZP CSI-RS resources need to be configured, and consequently, a large quantity of downlink transmission resources are occupied.

In view of this, the embodiments of the present invention provide a channel state information processing method and apparatus, so that the system is scalable when coordinated base stations increase, and less downlink transmission resources are occupied.

The 3rd Generation Partnership Project (3GPP) new radio (NR) defines a new CSI measurement reporting architecture, including CSI reporting setting information (CSI Reporting Setting), resource setting information (Resource Setting), and measurement setting information (Measurement Setting). One measurement setting is configured for one terminal device, and the measurement setting includes at least one CSI reporting setting, at least one resource setting, and at least one link. One link indicates an association between one CSI reporting setting and one resource setting, and also indicates that the resource setting is used for channel measurement or interference measurement.

FIG. 1 is an example diagram of a measurement setting indication scheme based on the CSI measurement reporting architecture. For example, a CSI reporting setting 0 is connected to a resource setting 0 and a resource setting 1 by using two links respectively. The resource setting 1 includes a plurality of channel state information interference measurement (CSI-IM) resources used for interference measurement. The resource setting 0 includes a plurality of channel state information reference signal (CSI-RS) resources used for channel measurement. In LTE, what is measured by using the resources in the resource setting 0 is used as a signal part, and what is measured by using the resources in the resource setting 1 is used as an interference part. The resources in the resource setting 0 include a plurality of NZP CMRs, for example, a resource 0, a resource 1, . . . , and a resource N in the figure. The resources in the resource setting 1 are a plurality of ZP IMRs, for example, a resource 0, a resource 1, . . . , and a resource N in the figure. One NZP CMR is in a one-to-one correspondence with one ZP IMR. For example, the resource 0 in the resource setting 0 is corresponding to the resource 0 in the resource setting 1. The foregoing NZP CMR and ZP IMR that are in a one-to-one correspondence jointly constitute one (channel and interference) measurement hypothesis condition.

If a plurality of interference measurement hypothesis conditions need to be measured, the network device needs to indicate a plurality of interference measurement hypothesis conditions. A plurality of indications are required, and several resources used for channel measurement and several resources used for interference measurement are indicated each time. Therefore, a large quantity of indication overheads exist, and multi-user interference measurement cannot be effectively supported in this manner.

Figure 2:
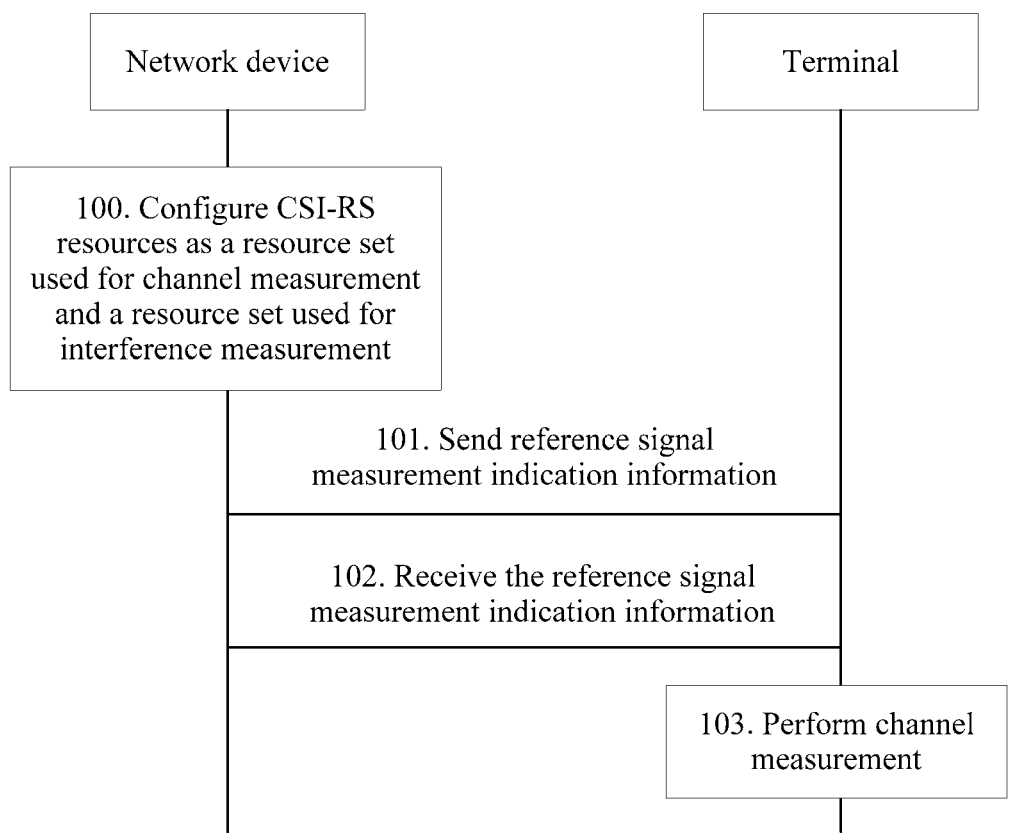
FIG. 2 is a schematic flowchart of a channel state information reference signal measurement method according to an embodiment of this application.

Therefore, an embodiment of this application provides a channel state information reference signal measurement indication method. As shown in FIG. 2, the method includes the following steps:

Step 100: A network device configures channel state information reference signal resources as a resource set used for channel measurement and a resource set used for interference measurement. The resource set used for channel measurement, namely, a resource set consisting of resources used for channel measurement (channel measurement resource set, CMR resource set for short), includes one or more non-zero power channel state information reference signal resources. The resource set used for interference measurement, namely, a resource set consisting of resources used for interference measurement (IMR resource set for short), includes at least one of a non-zero power channel state information reference signal resource and a zero power channel state information reference signal resource.

Step 101: The network device sends a reference signal measurement indication information to a terminal, where the indication information is used to indicate, to the terminal, the resource set used for channel measurement.

Step 102: The terminal receives the reference signal measurement indication information sent by the network device, where the indication information is used to indicate the resource set used for channel measurement.

Step 103: The terminal performs channel measurement by using the non-zero power channel state information reference signal resource in the resource set used for channel measurement and indicated by the indication information. Alternatively, further, the terminal performs interference measurement by using the non-zero power channel state information reference signal resource or the zero power channel state information reference signal resource in the resource set used for interference measurement and indicated by the indication information.

It should be noted that, in this embodiment of this application, the resource set used for channel measurement is referred to as a CMR resource set, and it indicates that the NZP CSI-RS resource included in the resource set is used for channel measurement. The resource set used for interference measurement is referred to as an IMR resource set, and it indicates that either or both of the NZP CSI-RS resource and the ZP CSI-RS resource included in the resource set is used for interference measurement.

During implementation of the channel state information reference signal measurement indication method, there may be a correspondence between the CMR resource set and the IMR resource set that are configured by the network device. Alternatively, there may be no correspondence between the CMR resource set and the IMR resource set. In other words, there may be a flexible collocation relationship between the CMR resource set and the IMR resource set.

Figure 3:
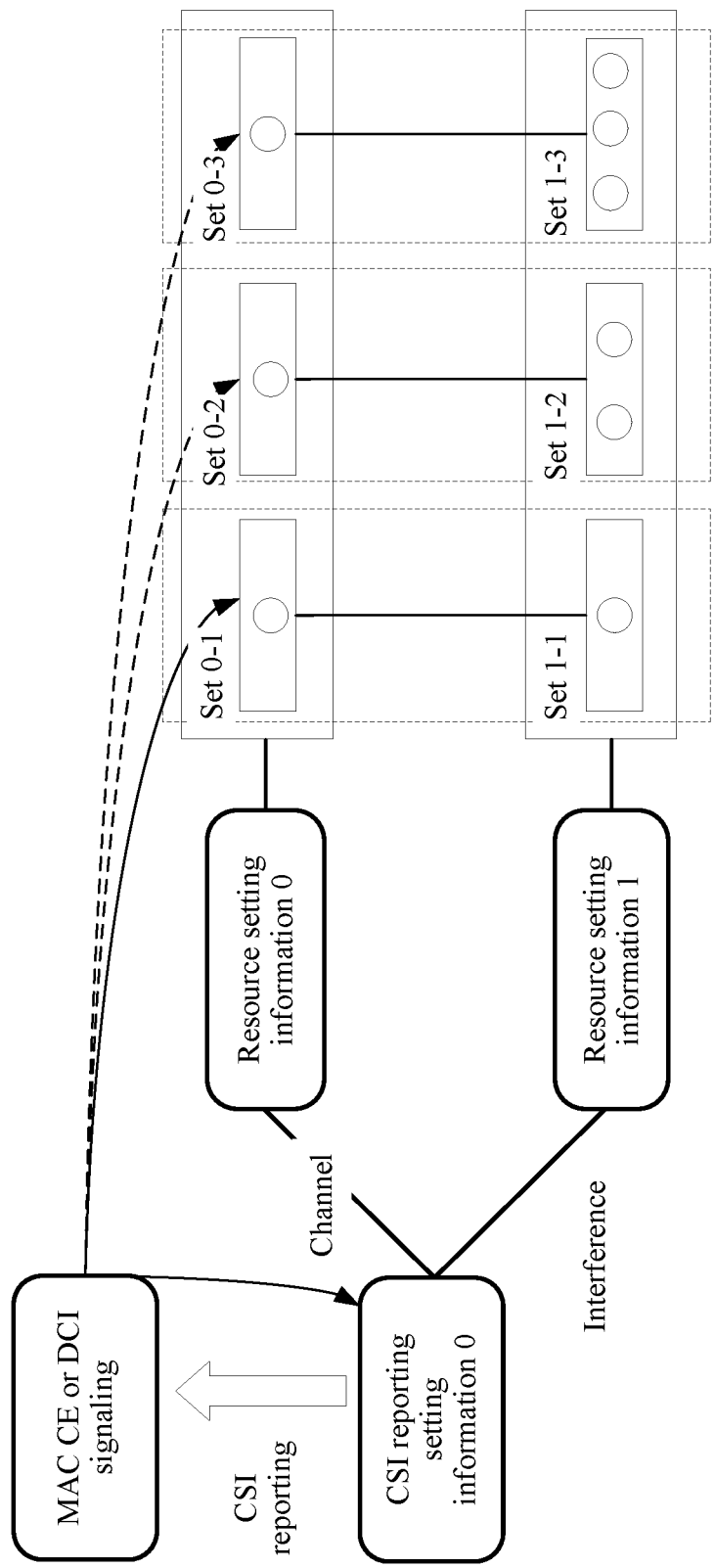
FIG. 3 is a schematic diagram of configuration for channel state information reference signal measurement according to an embodiment of this application.

There is a correspondence between the CMR resource set and the IMR resource set. That is, the CMR resource set may be in a fixed one-to-one collocation relationship with the IMR resource set, or a quantity of CMR resource sets is the same as that of the IMR resource sets. In this configuration manner, the network device notifies, by using first signaling, the terminal device of the CMR resource set and the IMR resource set that are configured by the network device, and the correspondence between the CMR resource set and the IMR resource set. Then, the network device sends indication information to the terminal, and the indication information is used to indicate an identifier of the resource set used for channel measurement (CMR resource set ID) and a channel state information reporting setting identifier (CSI reporting setting ID). Because there is a correspondence between the CMR resource set and the IMR resource set, the network device does not need to additionally indicate, to the terminal, the resource set used for interference measurement. After receiving the indicated resource set used for channel measurement, the terminal device can obtain a resource set that is used for interference measurement and corresponding to the resource set used for channel measurement. After performing channel measurement and interference measurement according to the indication, the terminal device performs CSI reporting according to the CSI reporting setting ID indicated by the indication information. A specific implementation process is shown in FIG. 3 and Embodiment 1.

Embodiment 1

Embodiment 1 of this application mainly describes a configuration and indication method for fixed collocation of a CMR resource set and an IMR resource set, and a core of Embodiment 1 is as follows:

A network device configures a correspondence between the CMR resource set and the IMR resource set, and the CMR resource set is corresponding to the IMR resource set; and the network device completes, according to an indication of the CMR resource set, a joint indication for channel measurement hypothesis and interference measurement hypothesis measurement resources.

As shown in FIG. 2, in Embodiment 1, there are specifically a plurality of CMR resource sets and IMR resource sets.

A network side indicates, by using a link 0, that a resource setting 0 is used for channel measurement, and indicates, by using a link 1, that a resource setting 1 is used for interference measurement.

The resource setting 0 is used for channel measurement and includes $S_{CMR} \geq 1$ CSI-RS resource sets, namely, CMR resource sets that are respectively a set 0-1, a set 0-2, and a set 0-3. Each CSI-RS resource set includes one or more NZP CSI-RS resources (NZP CMR) (a small circle in FIG. 3 represents one resource, and other embodiments are similar).

The resource setting 1 is used for interference measurement and includes $S_{IMR} \geq 1$ CSI-RS resource sets, namely, IMR resource sets that are respectively a set 1-1, a set 1-2, and a set 1-3. Each CSI-RS resource set may include one or more NZP CSI-RS resources (NZP IMR), or one or more ZP CSI-RS resources (ZP IMR), or one or more NZP IMRs and one or more ZP IMRs.

$S_{CMR}$ is the same as $S_{IMR}$, namely, $S_{CMR}=S_{IMR}$.

The network device configures, by using first signaling, that a CSI-RS resource set in the resource setting 0 is in a fixed one-to-one collocation relationship with a CSI-RS resource set in the resource setting 1. For example, the network device configures that the CMR resource set is in fixed collocation with the IMR resource set, and configures that the set 0-1 is corresponding to the set 1-1, the set 0-2 is corresponding to the set 1-2, and the set 0-3 is corresponding to the set 1-3.

A possible implementation is as follows:

One or more resource sets are configured in the resource setting 0:

RS-SET-List SEQUENCE (SIZE (1 . . . S)) OF CSI-RS-SET-ConfigId

One (set ID) of the $S_{CMR}$ CSI-RS resource sets is written into each entry of the list.

One or more resource sets are configured in the resource setting 1:

RS-SET-List SEQUENCE (SIZE (1 . . . S)) OF CSI-RS-SET-ConfigId

Set IDs included in entries at a same location of the two lists are collocated and combined into one channel and interference measurement resource combination:

collocation of Resource setting 0 RS-SET-List (0) and Resource setting 1 RS-SET-List (0);

collocation of Resource setting 0 RS-SET-List (1) and Resource setting 1 RS-SET-List (1);

. . .

collocation of Resource setting 0 RS-SET-List (S-1) and Resource setting 1 RS-SET-List (S-1).

In this configuration manner, a solution in which the network device sends indication information to a terminal for indication is as follows:

A possible implementation is using a joint field (Joint field) indication. The network side indicates {CSI reporting setting ID, CSI-RS resource set ID} information by using second signaling of N bits. The CSI-RS resource set ID is a set ID included in RS-SET-LIST configured in the resource setting 0, as shown in Table 1.

TABLE 1

| Value of CSI request field | Description |
| --- | --- |
| '00' | No CSI report is triggered |
| '01' | CSI report is triggered for 1st set of {CSI reporting setting, CSI-RS resource set} |
| '10' | CSI report is triggered for 2nd set of {CSI reporting setting, CSI-RS resource set} |
| '11' | CSI report is triggered for 3rd set of {CSI reporting setting, CSI-RS resource set} |

Another possible implementation is using a separate field (Separate field) indication. The network device indicates a CSI reporting setting ID by using N1 bits, and indicates a CSI-RS resource set ID by using N2 bits, as shown in Table 2.

TABLE 2

| | Description |
| --- | --- |
| Value of CSI request field | |
| '00' | No CSI report is triggered |
| '01' | CSI report is triggered for 1st set of {CSI reporting setting} |
| '10' | CSI report is triggered for 2nd set of {CSI reporting setting} |
| '11' | CSI report is triggered for 3rd set of {CSI reporting setting} |
| Value of CSI-RS trigger field | |
| '00' | No CSI-RS is triggered |
| '01' | CSI-RS is triggered for 1st set of {CSI-RS resource set} |
| '10' | CSI-RS is triggered for 2nd set of {CSI-RS resource set} |
| '11' | CSI-RS is triggered for 3rd set of {CSI-RS resource set} |

According to the foregoing signaling configuration and indication, the terminal performs CSI measurement on a corresponding channel measurement resource and a corresponding interference measurement resource, and reports a CSI report according to a corresponding CSI reporting setting.

A beneficial effect of Embodiment 1 of this application is to support unified configuration of the CMR and the IMR, and also support flexible configuration of the NZP IMR and the ZP IMR. Because specific application scenarios have different interference conditions, the network side can meet different CMR and IMR measurement requirements by using the foregoing configuration and indication method, so as to ensure reporting quality of CSI information such as a CQI.

Figure 4:
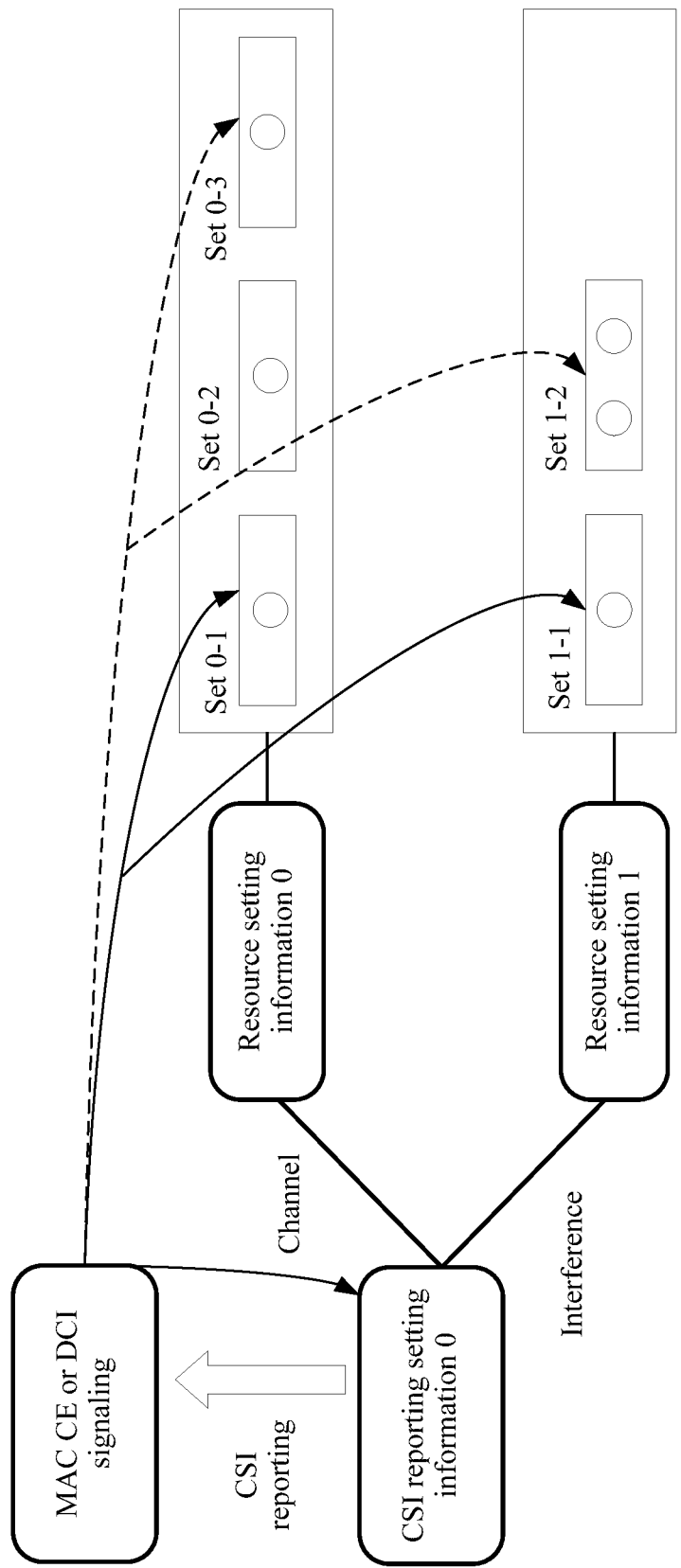
FIG. 4 is a schematic diagram of another configuration for channel state information reference signal measurement according to an embodiment of this application.

When the CMR resource set and the IMR resource set are not in a fixed one-to-one collocation relationship, in this configuration manner, the network device notifies, by using first signaling, the terminal device of the CMR resource set and the IMR resource set that are configured by the network device. Then, the network device sends indication information to the terminal, and the indication information is used to indicate a resource set used for channel measurement, a resource set used for interference measurement, and a channel state information reporting setting identifier (CSI reporting setting ID). After receiving the indicated resource set used for channel measurement and the indicated resource set used for interference measurement, the terminal device performs channel measurement and interference measurement according to the indication, and then performs CSI reporting by using the CSI reporting setting ID indicated by the indication information. Details are shown in FIG. 4 and Embodiment 2.

Embodiment 2

Embodiment 2 of this application mainly describes a configuration and indication method for flexible collocation of a CMR resource set and an IMR resource set, and a core of Embodiment 2 is as follows:

There is no predetermined correspondence between a CMR resource set and an IMR resource set that are configured by a network device; and the network device completes, by using an indication of {CMR resource set, IMR resource set}, a joint indication for channel measurement hypothesis and interference measurement hypothesis measurement resources.

Specifically, as shown in FIG. 4, a resource setting 0 is used for channel measurement and includes $S_{CMR} \geq 1$ CSI-RS resource sets, namely, CMR resource sets that are respectively a set 0-1, a set 0-2, and a set 0-3. Each CSI-RS resource set includes one or more NZP CSI-RS resources (NZP CMR); and a resource setting 1 is used for interference measurement and includes $S_{IMR} \geq 1$ CSI-RS resource sets, namely, IMR resource sets that are respectively a set 1-1 and a set 1-2. Each CSI-RS resource set may include one or more NZP CSI-RS resources (NZP IMR), or one or more ZP CSI-RS resources (ZP IMR), or one or more NZP IMRs and one or more ZP IMRs.

$S_{CMR}$ may be the same as or different from $S_{IMR}$, and the CMR resource set and the IMR resource set are not in a fixed correspondence and can be flexibly collocated.

The network device configures a CSI-RS resource set in the resource setting 0 and a CSI-RS resource set in the resource setting 1 by using first signaling. A possible implementation is as follows:

One or more resource sets are configured in the resource setting 0:

CMR-SET-List SEQUENCE (SIZE (1 . . . $S_{CMR}$)) OF CSI-RS-SET-ConfigId

One or more resource sets are configured in the resource setting 1:

IMR-SET-List SEQUENCE (SIZE (1 . . . $S_{IMR}$)) OF CSI-RS-SET-ConfigId

In this configuration manner, a solution in which the network device sends indication information to a terminal for indication is as follows:

A possible implementation is using a joint field indication. The network device indicates {CSI reporting setting ID, CMR resource set ID, IMR resource set ID} information by using second signaling of N bits. The CMR resource set ID is a CSI-RS resource set ID included in the resource setting 0, and the IMR resource set ID is a CSI-RS resource set ID included in the resource setting 1, as shown in Table 3.

TABLE 3

| Value of CSI request field | Description |
| --- | --- |
| '00' | No CSI report is triggered |
| '01' | CSI report is triggered for $1^{st}$ set of {CSI reporting setting, CMR resource set, IMR resource set} |
| '10' | CSI report is triggered for $2^{nd}$ set of {CSI reporting setting, CMR resource set, IMR resource set} |
| '11' | CSI report is triggered for $3^{rd}$ set of {CSI reporting setting, CMR resource set, IMR resource set} |

Another possible implementation is using a separate field indication. The network device indicates a CSI reporting setting ID by using N1 bits, and indicates {CMR resource set ID, IMR resource set ID} by using N2 bits, as shown in Table 4.

TABLE 4

| | Description |
| --- | --- |
| Value of CSI request field | |
| '00' | No CSI report is triggered |
| '01' | CSI report is triggered for $1^{st}$ set of {CSI reporting setting} |
| '10' | CSI report is triggered for $2^{nd}$ set of {CSI reporting setting} |
| '11' | CSI report is triggered for $3^{rd}$ set of {CSI reporting setting} |
| Value of CSI-RS trigger field | |
| '00' | No CSI-RS is triggered |
| '01' | CSI-RS is triggered for $1^{st}$ set of {CMR resource set, IMR resource set} |
| '10' | CSI-RS is triggered for $2^{nd}$ set of {CMR resource set, IMR resource set} |
| '11' | CSI-RS is triggered for $3^{rd}$ set of {CMR resource set, IMR resource set} |

A third possible implementation is using a separate field indication. The network device indicates a CSI reporting setting ID by using N1 bits, indicates a CMR resource set ID by using N2 bits, and indicates an IMR resource set ID by using N3 bits, as shown in Table 5.

TABLE 5

| | Description |
| --- | --- |
| Value of CSI request field | |
| '00' | No CSI report is triggered |
| '01' | CSI report is triggered for $1^{st}$ set of {CSI reporting setting} |
| '10' | CSI report is triggered for $2^{nd}$ set of {CSI reporting setting} |
| '11' | CSI report is triggered for $3^{rd}$ set of {CSI reporting setting} |

TABLE 5-continued

| | Description |
| --- | --- |
| Value of CMR trigger field | |
| '00' | No CSI-RS is triggered |
| '01' | CSI-RS is triggered for $1^{st}$ set of {CSI-RS resource set} |
| '10' | CSI-RS is triggered for $2^{nd}$ set of {CSI-RS resource set} |
| '11' | CSI-RS is triggered for $3^{rd}$ set of {CSI-RS resource set} |
| Value of IMR trigger field | |
| '00' | No CSI-RS is triggered |
| '01' | CSI-RS is triggered for $1^{st}$ set of {CSI-RS resource set} |
| '10' | CSI-RS is triggered for $2^{nd}$ set of {CSI-RS resource set} |
| '11' | CSI-RS is triggered for $3^{rd}$ set of {CSI-RS resource set} |

A beneficial effect of Embodiment 2 of this application is to support flexible collocation of the CMR and the IMR, and also support flexible configuration of the NZP IMR and the ZP IMR. Because specific application scenarios have different interference conditions, a network side can meet different CMR and IMR measurement requirements by using the foregoing configuration and indication method, so as to ensure reporting quality of CSI information such as a CQI.

In the method provided in this embodiment of this application, during configuration of the CMR resource set and the IMR resource set, a predefined interference hypothesis condition is further considered. That is, the network device configures that CMR resource sets and IMR resource sets constitute several channel and interference measurement hypothesis conditions. Each channel and interference measurement hypothesis condition is corresponding to one channel measurement resource set (including one or more CMRs) and one interference measurement resource set (including one or more NZP IMRs and one or more ZP IMRs). In this configuration manner, the network device sends the configuration manner to the terminal by using first signaling, and sends indication information to the terminal. The indication information is used to indicate the channel and interference hypothesis condition (Measurement hypothesis) and a channel state information reporting setting identifier. After receiving the indicated channel and interference hypothesis condition, the terminal device can obtain the resource set used for channel measurement and the resource set used for interference measurement, performs channel measurement and interference measurement, and then performs CSI reporting by using the CSI reporting setting ID indicated by the indication information. Details are shown in Embodiment 3.

Embodiment 3

Embodiment 3 of this application mainly describes a configuration and indication method based on a predefined channel and interference hypothesis condition, and a core of the Embodiment 3 is as follows:

A network device configures a collocation relationship between a CMR resource set and an IMR resource set; and the network device completes, by using an indication of {Measurement hypothesis}, a joint indication for channel measurement hypothesis and interference measurement hypothesis measurement resources.

As shown in FIG. 4, the network device configures, by using first signaling, that CSI-RS resource sets in a resource setting 0 and CSI-RS resource sets in a resource setting 1 constitute several channel and interference measurement hypothesis conditions. Each channel and interference measurement hypothesis condition is corresponding to one group of channel measurement resources (including one or more CMRs) and one group of interference measurement resources (including one or more NZP IMRs and one or more ZP IMRs).

A possible configuration implementation is shown in Table 6:

TABLE 6

| Measurement hypothesis index | Description |
| --- | --- |
| 1 | 1st set of {CMR resource set, IMR resource set} |
| 2 | 2nd set of {CMR resource set, IMR resource set} |
| 3 | 3rd set of {CMR resource set, IMR resource set} |

In this configuration manner, a solution in which the network device sends indication information to a terminal for indication is as follows:

A possible implementation is using a joint field indication. The network device indicates {CSI reporting setting ID, Measurement hypothesis ID} information by using second signaling N bits, and the measurement hypothesis ID is a measurement hypothesis index determined in the foregoing table, and represents a corresponding CMR set and a corresponding IMR set, as shown in Table 7.

TABLE 7

| Value of CSI request field | Description |
| --- | --- |
| '00' | No CSI report is triggered |
| '01' | CSI report is triggered for 1st set of {CSI reporting setting, Measurement hypothesis} |
| '10' | CSI report is triggered for 2nd set of {CSI reporting setting, Measurement hypothesis} |
| '11' | CSI report is triggered for 3rd set of {CSI reporting setting, Measurement hypothesis} |

Another possible implementation is using a separate field indication. The network device indicates CSI reporting setting ID information by using N1 bits, and indicates measurement hypothesis ID information by using N2 bits. The measurement hypothesis ID is a measurement hypothesis index determined in the foregoing table and represents a corresponding CMR set and a corresponding IMR set, as shown in Table 8.

TABLE 8

| Value of CSI request field | Description |
| --- | --- |
| '00' | No CSI report is triggered |
| '01' | CSI report is triggered for 1st set of {CSI reporting setting} |
| '10' | CSI report is triggered for 2nd set of {CSI reporting setting} |
| '11' | CSI report is triggered for 3rd set of {CSI reporting setting} |

TABLE 8-continued

| Value of hypothesis trigger field | Description |
| --- | --- |
| '00' | No CSI-RS is triggered |
| '01' | CSI-RS is triggered for 1st set of {Measurement hypothesis} |
| '10' | CSI-RS is triggered for 2nd set of {Measurement hypothesis} |
| '11' | CSI-RS is triggered for 3rd set of {Measurement hypothesis} |

A beneficial effect of Embodiment 3 is to support flexible collocation of the CMR and the IMR, and also support flexible configuration of the NZP IMR and the ZP IMR. Because specific application scenarios have different channel and interference measurement conditions, a network side can meet different CMR and IMR measurement requirements by using the foregoing configuration and indication method, so as to ensure reporting quality of CSI information such as a CQI.

In the foregoing several implementations, the network device delivers the first signaling to the terminal to indicate configuration made by the network device. Usually, the first signaling is carried by using higher layer signaling such as radio resource control (radio resource control, RRC) or a MAC control element (Media Access Control control element, MAC CE).

The network device sends the indication information to the terminal. Content indicated by the indication information, for example, one or more pieces of information in the CMR resource set, the IMR resource set, the CSI reporting setting ID, and the measurement hypothesis, may be indicated by using one piece of second signaling, namely, by using a joint field (joint field), or may be indicated by using several fields, namely, by using separate fields (separate field). In other words, the content is indicated by using the second signaling, third signaling, or even more signaling. The indication information herein may be carried by using downlink control information (downlink control information, DCI) or may be carried by using higher layer signaling such as a MAC control element (Media Access Control control element, MAC CE). Subsequent embodiments are similar.

A length of a DCI field used for carrying the indication information depends on a quantity of resources configured by the RRC or a quantity of resource sets, or is a fixed value. In addition, a quantity of DCI fields depends on a configuration of the network device or a predefined rule.

The network device configures the CMR resource set and the IMR resource set for the terminal, supports flexible configuration of the NZP IMR and the ZP IMR, and can meet different CMR and IMR measurement requirements, so as to ensure reporting quality of CSI information such as a CQI on the terminal side.

The network device configures channel state information reference signal resources based on a granularity of a resource set, and configures the channel state information reference signal resources as a resource set used for channel measurement and a resource set used for interference measurement.

Figure 5:
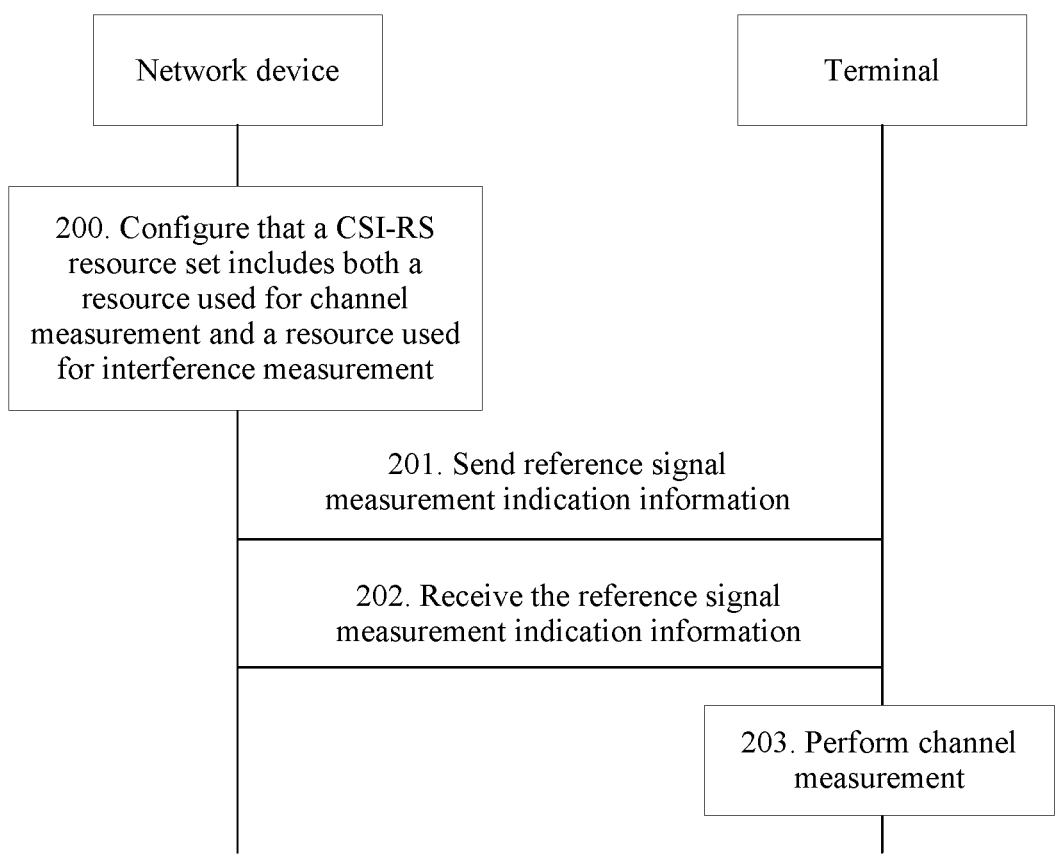
FIG. 5 is a schematic flowchart of another channel state information reference signal measurement method according to an embodiment of this application.

The embodiments of this application, for a channel state information reference signal resource, a network device may further configure that a resource of a channel state information reference signal resource set can be used for both channel measurement and interference measurement. A resource used for channel measurement includes one or more non-zero power channel state information reference signal resources. A resource used for interference measurement includes at least one of a non-zero power channel state information reference signal resource and a zero power channel state information reference signal resource. In other words, an NZP CMR and an NZP IMR may be configured in one CSI-RS resource set instead of different CSI-RS resource sets. This method is more flexible and can satisfy different application scenarios. As shown in FIG. 5, a method process in this embodiment is as follows:

Step 200: A network device configures that a channel state information reference signal resource set includes a resource used for channel measurement and a resource used for interference measurement, where the resource used for channel measurement includes one or more non-zero power channel state information reference signal resources, and the resource used for interference measurement includes at least one of a non-zero power channel state information reference signal resource and a zero power channel state information reference signal resource.

Step 201: The network device sends reference signal measurement indication information to a terminal, where the indication information is used to indicate, to the terminal, at least one of the resource used for channel measurement or the resource used for interference measurement in the channel state information reference signal resource set.

Step 203: Receive the reference signal measurement indication information sent by the network device, where the indication information is used to indicate the resource used for channel measurement, and the resource used for channel measurement is one or more non-zero power channel state information reference signal resources.

Step 204: Perform channel measurement by using the resource used for channel measurement and indicated by the indication information.

Figure 6:
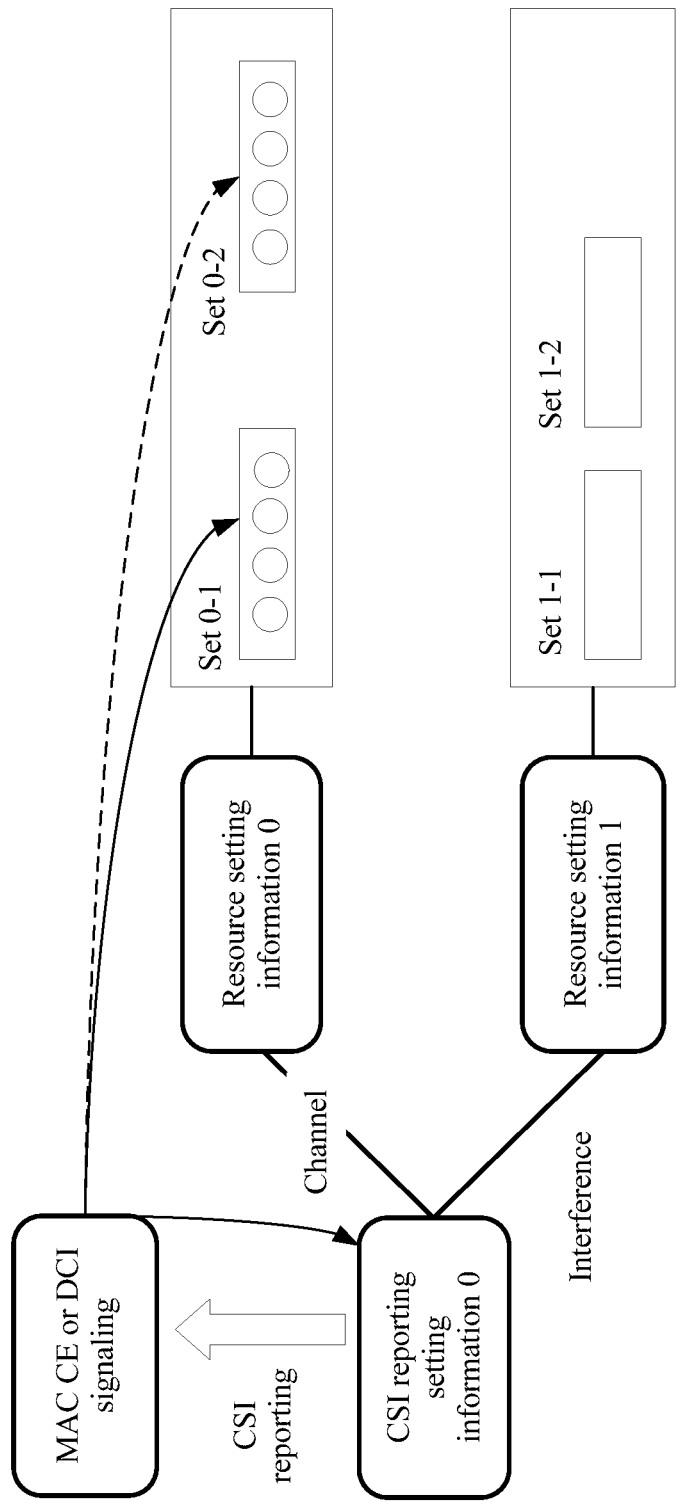
FIG. 6 is a schematic diagram of another configuration for channel state information reference signal measurement according to an embodiment of this application.

Details are shown in FIG. 6 and Embodiment 4.

Embodiment 4

Embodiment 4 of this application describes a configuration and indication method for a CSI-RS resource set including both an NZP CMR and an NZP IMR, and a core of Embodiment 4 is as follows:

A CSI-RS resource set configured by a network device includes both NZP CMRs and NZP IMRs, some or all of the NZP CMRs and the NZP IMRs may be same NZP CSI-RS resources; and the network device determines, by using an indication of the CSI-RS resource set, NZP CSI-RS resources used for channel and interference measurement. Specifically, the network device determines a resource used for channel measurement and a resource used for interference measurement in the foregoing resource set by indicating the CMR and the IMR.

The network device indicates, by using a link 0, that a resource setting 0 is used for channel measurement, and indicates, by using a link 1, that a resource setting 1 is used for interference measurement. An NZP CSI-RS resource configured in the resource setting 0 can be used for both channel measurement and interference measurement. A ZP CSI-RS resource configured in the resource setting 1 is used for interference measurement. The resource setting 0 includes S≥1 CSI-RS resource sets, and each CSI-RS resource set includes one or more NZP CSI-RS resources. One or more NZP CSI-RSs are used for channel measurement (NZP CMR), one or more NZP CSI-RSs are used for interference measurement (NZP IMR), and some or all of the NZP CMRs and the NZP IMRs may be same NZP CSI-RS resources.

The network device configures a CSI-RS resource set in the resource setting 0 by using first signaling. A possible implementation is as follows:

One or more resource sets are configured in the resource setting 0:

RS-SET-List SEQUENCE (SIZE (1 . . . S)) OF RS-SET-ConfigId

One or more CSI-RS resources are configured in RS-SET-Config:

CSI-RS-ResourceConfigList SEQUENCE {SIZE (1 . . . K)} OF CSI-RS-ResourceConfig

In this configuration manner, a solution in which the network device sends indication information to a terminal for indication is as follows:

A possible implementation is using a joint field indication. The network device indicates {CSI reporting setting ID, CSI-RS resource set ID} information by using second signaling N1 bits. The CSI-RS resource set ID is a CSI-RS resource set ID included in the resource setting 0, as shown in Table 9.

TABLE 9

| Value of CSI request field | Description |
|---|---|
| '00' | No CSI report is triggered |
| '01' | CSI report is triggered for 1st set of {CSI reporting setting, CSI-RS resource set} |
| '10' | CSI report is triggered for 2nd set of {CSI reporting setting, CSI-RS resource set} |
| '11' | CSI report is triggered for 3rd set of {CSI reporting setting, CSI-RS resource set} |

When the CSI-RS resource set includes one NZP CSI-RS, the NZP CSI-RS is used for channel measurement. When the CSI-RS resource set includes a plurality of NZP CSI-RSs, any one NZP CSI-RS is used for channel measurement, and a remaining NZP CSI-RS is used for interference measurement. For example, when a CSI-RS resource set includes three NZP CSI-RS resources: {NZP CSI-RS 0, NZP CSI-RS 1, NZP CSI-RS 2}, there are the following three collocation manners, as shown in Table 10.

TABLE 10

| Measurement hypothesis | CMR | IMR |
|---|---|---|
| 1 | NZP CSI-RS 0 | NZP CSI-RS 1, NZP CSI-RS 2 |
| 2 | NZP CSI-RS 1 | NZP CSI-RS 0, NZP CSI-RS 2 |
| 3 | NZP CSI-RS 2 | NZP CSI-RS 0, NZP CSI-RS 1 |

The three collocation manners of channel measurement resources and interference measurement resources are corresponding to three CSI reports.

In another implementation, the network device indicates {CSI reporting setting ID, CSI-RS resource set ID, CMR resource} information by using second signaling of N bits. The CSI-RS resource set ID is a CSI-RS resource set ID included in the resource setting 0. The CMR resource is NZP CSI-RS resource information used for channel measurement and included in a CSI-RS resource set indicated by the CSI-RS resource set ID, as shown in Table 11.

TABLE 11

| Value of CSI request field | Description |
| --- | --- |
| '00' | No CSI report is triggered |
| '01' | CSI report is triggered for 1st set of {CSI reporting setting, CSI-RS resource set, CMR ID} |
| '10' | CSI report is triggered for 2nd set of {CSI reporting setting, CSI-RS resource set, CMR ID} |
| '11' | CSI report is triggered for 3rd set of {CSI reporting setting, CSI-RS resource set, CMR ID} |

Some or all of NZP CSI-RS resources that are not indicated by the CMR ID in the CSI-RS resource set are used for interference measurement.

In a third implementation, the network device indicates {CSI reporting setting ID, CSI-RS resource set ID, IMR resource} by using second signaling of N bits. The CSI-RS resource set ID is a CSI-RS resource set ID included in the resource setting 0. The IMR resource is NZP CSI-RS resource information used for interference measurement and included in a CSI-RS resource set indicated by the CSI-RS resource set ID, as shown in Table 12.

TABLE 12

| Value of CSI request field | Description |
| --- | --- |
| '00' | No CSI report is triggered |
| '01' | CSI report is triggered for 1st set of {CSI reporting setting, CSI-RS resource set, IMR ID} |
| '10' | CSI report is triggered for 2nd set of {CSI reporting setting, CSI-RS resource set, IMR ID} |
| '11' | CSI report is triggered for 3rd set of {CSI reporting setting, CSI-RS resource set, IMR ID} |

Some or all of other NZP CSI-RS resources that are not indicated by the IMR ID in the CSI-RS resource set are used for channel measurement.

In a fourth implementation, the network device indicates {CSI reporting setting ID, CSI-RS resource set ID, CMR resource, IMR resource} by using second signaling of N bits. The CSI-RS resource set ID is a CSI-RS resource set ID included in the resource setting 0. The CMR resource is NZP CSI-RS resource information used for channel measurement and included in a CSI-RS resource set indicated by the CSI-RS resource set ID. The IMR resource is NZP CSI-RS resource information used for interference measurement and included in a CSI-RS resource set indicated by the CSI-RS resource set ID, as shown in Table 13.

TABLE 13

| Value of CSI request field | Description |
| --- | --- |
| '00' | No CSI report is triggered |
| '01' | CSI report is triggered for 1st set of {CSI reporting setting, CSI-RS resource set, CMR ID, IMR ID} |
| '10' | CSI report is triggered for 2nd set of {CSI reporting setting, CSI-RS resource set, CMR ID, IMR ID} |
| '11' | CSI report is triggered for 3rd set of {CSI reporting setting, CSI-RS resource set, CMR ID, IMR ID} |

Some or all of the NZP CMRs and the NZP IMRs may be same NZP CSI-RS resources.

It should be noted that in {CSI reporting setting, CSI-RS resource set, CMR ID, IMR ID}, a first part of the parameters is indicated by using N1 bits, a second part of the parameters is indicated by using N2 bits, . . . , and an $M^{th}$ (≥4) part of the parameters is indicated by using Nm bits. Refer to the solution of the separate field described in Embodiment 1 and Embodiment 2. Details are not described herein again.

A beneficial effect of Embodiment 4 of this application is to support flexible configuration and indicating of the CMR and the IMR when the NZP CMR and the NZP IMR are configured in a same resource setting. Because specific application scenarios have different measurement and interference hypothesis conditions, a network side can meet different CMR and IMR measurement requirements by using the foregoing configuration and indication method, so as to ensure reporting quality of CSI information such as a CQI.

In the method provided in this embodiment of this application, when a CMR resource and an IMR resource are configured in a CSI-RS resource set, a predefined interference hypothesis condition may also be considered. In other words, the network device may further configure, based on a channel and interference measurement hypothesis condition, which resource in the CSI-RS resource set is used as a CMR resource and which resource in the CSI-RS resource set is used as an IMR resource. Details are shown in FIG. 6 and Embodiment 5.

Embodiment 5

Embodiment 5 of this application describes a method for configuring, based on a predefined interference hypothesis condition, that a CSI-RS resource set includes both an NZP CMR and an NZP IMR, and an indication method thereof.

A main core of Embodiment 5 is as follows:

A network device configures a collocation relationship between a CMR resource and an IMR resource; and the network device completes, by using an indication of {Measurement hypothesis}, a joint indication for channel measurement hypothesis and interference measurement hypothesis measurement resources.

The network device configures, by using first signaling, that NZP CMRs and NZP IMRs in any CSI-RS resource set in a resource setting 0 constitute several channel and interference measurement hypothesis conditions. Some or all of the NZP CMRs and the NZP IMRs may be same NZP CSI-RS resources.

A possible implementation is shown in FIG. 14.

TABLE 14

| Measurement hypothesis index | Description |
| --- | --- |
| 1 | 1st set of {CMR resource (s)} from resource set |
| 2 | 2nd set of {CMR resource (s)} from resource set |
| 3 | 3rd set of {CMR resource (s)} from resource set |

{CMR resource (s)} may be all or some of NZP CSI-RS resources in the CSI-RS resource set. When the CSI-RS resource set includes one NZP CSI-RS, the NZP CSI-RS is used for channel measurement. When the CSI-RS resource set includes a plurality of NZP CSI-RSs, any one NZP CSI-RS is used for channel measurement, and a remaining NZP CSI-RS is used for interference measurement. For example, when a CSI-RS resource set includes five NZP CSI-RS resources, and the measurement hypothesis index 1 indicates three NZP CSI-RS resources: {NZP CSI-RS 0, NZP CSI-RS 1, NZP CSI-RS 2}, there are the following three collocation manners, as shown in Table 15.

TABLE 15

| Measurement hypothesis | CMR | IMR |
| --- | --- | --- |
| 1 | NZP CSI-RS 0 | NZP CSI-RS 1, NZP CSI-RS 2 |
| 2 | NZP CSI-RS 1 | NZP CSI-RS 0, NZP CSI-RS 2 |
| 3 | NZP CSI-RS 2 | NZP CSI-RS 0, NZP CSI-RS 1 |

The three collocation manners of channel measurement resources and interference measurement resources are corresponding to three CSI reports.

Another possible implementation is shown in FIG. 16.

TABLE 16

| Measurement hypothesis index | Description |
| --- | --- |
| 1 | 1st set of {CMR resource (s), IMR resource (s)} |
| 2 | 2nd set of {CMR resource (s), IMR resource (s)} |
| 3 | 3rd set of {CMR resource (s), IMR resource (s)} |

{CMR resource (s)} may be all or some of NZP CSI-RS resources in the CSI-RS resource set and are used for channel measurement. {IMR resource (s)} may be all or some of NZP CSI-RS resources in the CSI-RS resource set and are used for interference measurement.

In this configuration manner, a solution in which the network device sends indication information to a terminal for indication is as follows:

A possible implementation is using a joint field indication. The network device indicates {CSI reporting setting ID, CSI-RS resource set ID, Measurement hypothesis ID} information by using second signaling N bits. The measurement hypothesis ID is a measurement hypothesis index that is determined in the foregoing table and is for a CSI-RS resource set indicated by the CSI-RS resource set ID, as shown in FIG. 17. When the resource setting includes only one resource set, an indication field of the CSI-RS resource set may be omitted.

TABLE 17

| Value of CSI request field | Description |
| --- | --- |
| '00' | No CSI report is triggered |
| '01' | CSI report is triggered for 1st set of {CSI reporting setting, CSI-RS resource set, Measurement hypothesis} |
| '10' | CSI report is triggered for 2nd set of {CSI reporting setting, CSI-RS resource set, Measurement hypothesis} |
| '11' | CSI report is triggered for 3rd set of {CSI reporting setting, CSI-RS resource set, Measurement hypothesis} |

Another possible implementation is using a separate field indication. That is, in {CSI reporting setting, CSI-RS resource set, Measurement hypothesis}, a first part of the parameters is indicated by using N1 bits, a second part of the parameters is indicated by using N2 bits, . . . , and an $M^{th}$ ($\leq 3$) part of the parameters is indicated by using Nm bits. When the resource setting includes only one resource set, an indication field of the CSI-RS resource set may be omitted. For details, refer to solutions of the separate field in Embodiment 1 to Embodiment 4, and details are not described herein again.

To further reduce configuration and indication overheads of the network device, before the network device configures channel state information reference signal resources as a resource set used for channel measurement and a resource set used for interference measurement, or configures that a channel state information reference signal resource set includes a resource used for channel measurement and a resource used for interference measurement, the method provided in this embodiment of this application further includes the following:

The network device sends, to the terminal, some channel state information reference signal resource sets that are selected from a plurality of channel state information reference signal resource sets and that are used for channel state information measurement, and some channel state information reporting settings that are selected from a plurality of channel state information reporting settings and that are used for channel state information reporting.

Then, the network device sends, to the terminal, second indication information that is used to indicate the selected channel state information reference signal resource sets and the selected channel state information reporting settings.

Details are shown in Embodiment 6.

Embodiment 6

Embodiment 6 mainly describes an implementation process of selecting some CSI-RS resource sets from a plurality of CSI-RS resource sets for CSI measurement, and selecting some CSI reporting settings from a plurality of CSI reporting settings for CSI reporting.

When a network device configures N CSI reporting settings and S CSI-RS resource sets for a terminal by using first signaling, limited by signaling indication overheads, the network device usually needs to select some ($N_p \leq N$) CSI reporting settings from the N CSI reporting settings and some ($N_s \leq S$) CSI-RS resource sets from the S CSI-RS resource sets by using second signaling. Then, in the indication manner in Embodiment 1 to Embodiment 5, the network device indicates measurement resources used for channel and interference measurement and corresponding CSI reporting by using second indication information.

For Embodiment 1, because there is fixed collocation between a CMR resource set and an IMR resource set, the network device completes, by using an indication of the CMR resource set, a joint indication for channel measurement hypothesis and interference measurement hypothesis measurement resources. Under this condition, the second indication information may include at least one of the following information:

1. $N_{ps}$ {CSI reporting setting, CSI-RS resource set} combinations of a CSI reporting setting and a CSI-RS resource set are selected from M {CSI reporting setting, CSI-RS resource set} collocation combinations, where $N_{ps} \leq M$.

In an implementation, an M-bit bitmap is configured. Each bit in the bitmap is corresponding to one collocation combination in the M {CSI reporting setting, CSI-RS resource set} collocation combinations. Less than $N_{ps}$ bits in M bits are set to 1 or 0, indicating that less than $N_{ps}$ {CSI reporting setting, CSI-RS resource set} collocation combinations are selected.

In this case, a corresponding joint field indication needs $\lceil \log N_{ps} \rceil$ bits. The network device sends the second indication information to the terminal to indicate $N_{ps}$ combinations of a CSI reporting setting and a CSI-RS resource set that are selected by the network device. Specifically, $\lceil \log N_{ps} \rceil$ bits may be used to indicate selecting of one combination from the selected $N_{ps}$ combinations of a CSI reporting setting and a CSI-RS resource set. Specifically, a correspondence between a CMR resource set and an IMR resource set that are in the CSI-RS resource set is indicated by using the first signaling in Embodiment 1. The terminal may learn of a corresponding IMR resource set according to a CMR resource set indicated by the indication information.

2. $N_p \leq N$ CSI reporting settings are selected from N CSI reporting settings.

In an implementation, an N-bit bitmap is configured, and each bit in the bitmap is corresponding to one of the N CSI reporting settings. Then, less than $N_p$ bits in N bits are set to 1 or 0, indicating that less than $N_p$ CSI reporting settings are selected.

A corresponding separate field indication needs $\lceil \log N_p \rceil$ bits. That is, the terminal is instructed, by using the $\lceil \log N_p \rceil$ bits, to select one setting from the selected $N_p$ CSI reporting settings.

3. $N_s \leq S$ CSI-RS resource sets are selected from S CSI-RS resource sets.

In an implementation, an S-bit bitmap is configured, and each bit in the bitmap is corresponding to one of the S CSI-RS resource sets. Less than $N_s$ bits in S bits are set to 1 or 0, indicating that less than $N_s$ CSI-RS resource sets are selected.

A corresponding separate field indication needs $\lceil \log N_s \rceil$ bits. That is, the terminal is instructed, by using the $\lceil \log N_s \rceil$ bits, to select one set from the selected $N_s$ CSI resource sets.

The network device may further adjust $\lceil \log N_p \rceil$ and/or $\lceil \log N_s \rceil$, or adjust $N_p$ and/or $N_s$, and allocate indication overheads between the CSI reporting setting and the CSI-RS resource set. In particular, when the CSI reporting setting or the CSI-RS resource set is unique, an indication bit may not be allocated.

For Embodiment 2, because there is flexible collocation between a CMR resource set and an IMR resource set, the network device completes, by using an indication of {CMR resource set, IMR resource set}, a joint indication for channel measurement hypothesis and interference measurement hypothesis measurement resources. Under this condition, the second indication information may include at least one of the following information:

$N_{ps} \leq M$ {CSI reporting setting, CMR resource set, IMR resource set} collocation combinations selected from M {CSI reporting setting, CMR resource set, IMR resource set} collocation combinations.

In an implementation, an M-bit bitmap is configured, and each bit in the bitmap is corresponding to one collocation combination of the M {CSI reporting setting, CMR resource set, IMR resource set} collocation combinations. Less than $N_{ps}$ bits in M bits are set to 1 or 0, indicating that less than $N_{ps}$ {CSI reporting setting, CSI-RS resource set} collocation combinations are selected.

A corresponding joint field indication needs $\lceil \log N_{ps} \rceil$ bits. In other words, the $\lceil \log N_{ps} \rceil$ bits may be used to indicate selecting of one combination from the selected $N_{ps}$ combinations.

1. $N_p \leq N$ CSI reporting settings are selected from N CSI reporting settings.

In an implementation, an N-bit bitmap is configured, and each bit in the bitmap is corresponding to one of the N CSI reporting settings. Less than $N_p$ bits in N bits are set to 1 or 0, indicating that less than $N_p$ CSI reporting settings are selected.

A corresponding third signaling separate field indication needs $\lceil \log N_p \rceil$ bits. In other words, the terminal is instructed, by using the $\lceil \log N_p \rceil$ bits, to select one setting from the selected $N_p$ CSI reporting settings.

2. The network device selects $N_{s_1}$ CSI-RS resource sets from $S_1$ CSI-RS resource sets for channel measurement, where $N_{s_1} \leq S_1$.

In an implementation, an $S_1$-bit bitmap is configured, and each bit in the bitmap is corresponding to one of the $S_1$ CSI-RS resource sets. Less than $N_{s_1}$ bits in $S_1$ bits are set to 1 or 0, indicating that less than $N_{s_1}$ CSI-RS resource sets are selected for channel measurement.

A corresponding separate field indication needs $\lceil \log N_{s_1} \rceil$ bits. In other words, the terminal is instructed, by using the $\lceil \log N_{s_1} \rceil$ bits, to select one resource set from the $N_{s_1}$ CSI resource sets that are selected for channel measurement.

3. The network device selects $N_{s_2}$ CSI-RS resource sets from $S_2$ CSI-RS resource sets for interference measurement, where $N_{s_2} \leq S_2$.

In an implementation, an $S_2$-bit bitmap is configured, and each bit in the bitmap is corresponding to one of the $S_2$ CSI-RS resource sets. Less than $N_{s_2}$ bits in $S_2$ bits are set to 1 or 0, indicating that less than $N_{s_2}$ CSI-RS resource sets are selected for interference measurement.

A corresponding separate field indication needs $\lceil \log N_{s_2} \rceil$ bits. In other words, the terminal is instructed, by using the $\lceil \log N_{s_2} \rceil$ bits, to select one resource set from the $N_{s_2}$ CSI resource sets that are selected for interference measurement.

By adjusting $\lceil \log N_p \rceil$ and/or $\lceil \log N_{s_1} \rceil$ and/or $\lceil \log N_{s_2} \rceil$ in other words, by adjusting $N_p$ and/or $N_{s_1}$ and/or $N_{s_2}$, in a condition of a limited total bit quantity, indication overheads are allocated between the CSI reporting settings and the CMR/IMR resource sets. In particular, when the CSI reporting setting or the CMR/IMR resource set is unique, an indication bit may not be allocated.

The foregoing M, N, $N_{ps}$, $N_s$, $N_{s_1}$, $N_{s_2}$, and $N_p$ are natural numbers greater than or equal to 1.

In another implementation, base on configuring a channel and interference measurement hypothesis condition, the network device may select a plurality of combinations from a plurality of combinations of a channel and interference measurement hypothesis condition and a CSI-RS reporting setting in the foregoing manner, and configure the plurality of combinations for the terminal. The selected combinations of a channel and interference measurement hypothesis condition and a CSI-RS reporting setting, or further information such as a CMR resource set and/or an IMR resource set may be indicated to the terminal by using a similar joint field indication or a separate field indication.

In addition, for an implementation in which both a CMR resource and an IMR resource are configured in a CSI-RS resource set, the CSI-RS resource set may also be first selected and then indicated by using corresponding second indication information.

In other words, the selection solution in Embodiment 6 may be applied to Embodiment 3 to Embodiment 5, and details are not described herein.

In the foregoing selection method, indication overheads can be reduced, and indication overheads can be flexibly allocated. Because specific application scenarios have different interference conditions, a network side can meet different CMR and IMR measurement requirements by using the foregoing configuration and indication method, so as to ensure reporting quality of CSI information such as a CQI.

During implementation of Embodiment 1 to Embodiment 6, optionally, the network device may further configure, in at least one of CSI reporting setting information, whether the terminal device performs periodic reporting. For example, the network device configures that the terminal device performs periodic (periodic) reporting, non-periodic (non-periodic) reporting, or semi-persistent (semi-persistent) reporting.

Optionally, the network device may further configure, in resource setting information, that the CSI-RS resource is periodically sent, or the CSI-RS resource is non-periodically sent, or the CSI-RS resource is semi-persistently sent. The CSI-RS resource may be an NZP CSI-RS resource or a ZP CSI-RS resource.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes the method in the embodiments of this application in detail, and the following describes an apparatus provided in the embodiments of this application.

Figure 7:
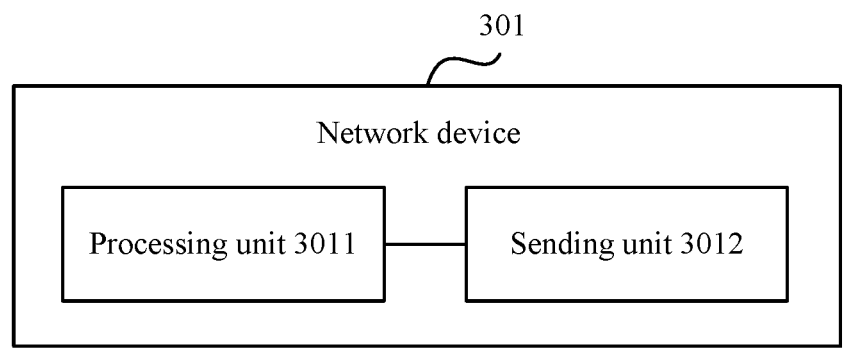
FIG. 7 is a schematic diagram of a network device according to an embodiment of this application.

Referring to FIG. 7, FIG. 7 is a schematic diagram of a logical structure of a network device according to an embodiment of the present invention. The network device 301 may include a processing unit 3011 and a sending unit 3012.

In an implementation, the processing unit 3011 is configured to configure a resource set used for channel measurement and a resource set used for interference measurement in a channel state information reference signal resource set, where the resource set used for channel measurement includes one or more non-zero power channel state information reference signal resources, and the resource set used for interference measurement includes at least one of a non-zero power channel state information reference signal resource and a zero power channel state information reference signal resource.

The sending unit 3012 is configured to send reference signal measurement indication information to a terminal, where the indication information is used to indicate, to the terminal, the resource set used for channel measurement.

The processing unit 3011 is further configured to configure that there is a correspondence between the resource set used for channel measurement and the resource set used for interference measurement; or configured to flexibly collocate the resource set used for channel measurement with the resource set used for interference measurement; or configured to configure at least one channel and interference hypothesis condition, where each channel and interference hypothesis condition is corresponding to one resource set used for channel measurement and one resource set used for interference measurement; or configured to first select the resource set used for channel measurement.

The sending unit 3012 is further configured to send, to the terminal, indication information indicating the resource set used for channel measurement and a channel state information reporting setting identifier; or further send, to the terminal, indication information indicating the resource set used for interference measurement and a channel state information reporting setting identifier; or send, to the terminal, indication information indicating the channel and interference hypothesis condition and a channel state information reporting setting identifier; or send, to the terminal, indication information including a resource setting identifier to distinguish between a resource used for channel measurement and a resource used for interference measurement.

It should be noted that the processing unit 3011 is configured to perform step 100 in the method embodiment shown in FIG. 2, and the sending unit 3012 is configured to perform step 101 in the method embodiment shown in FIG. 2. Certainly, the network device may further include a receiving unit that receives CSI-RS reporting reported by the terminal.

In another implementation of the network device, the processing unit 3011 is configured to configure that a channel state information reference signal resource set includes a resource used for channel measurement and a resource used for interference measurement, where the resource used for channel measurement includes one or more non-zero power channel state information reference signal resources, and the resource used for interference measurement includes at least one of a non-zero power channel state information reference signal resource and a zero power channel state information reference signal resource.

The sending unit 3012 is configured to send reference signal measurement indication information to a terminal, where the indication information is used to indicate, to the terminal, at least one of the resource used for channel measurement or the resource used for interference measurement in the channel state information reference signal resource set.

The processing unit 3011 is further configured to configure at least one channel and interference hypothesis condition, where each channel and interference hypothesis condition is corresponding to one resource used for channel measurement and one resource used for interference measurement; or further configured to first select the resource used for channel measurement.

The sending unit 3012 is further configured to send, to the terminal, indication information indicating the channel state information reference signal resource set and a channel state information reporting setting identifier; or send, to the terminal, indication information indicating the channel state information reference signal resource set, the resource used for channel measurement in the set, and a channel state information reporting setting identifier; or send, to the terminal, indication information indicating the channel state information reference signal resource set, the resource used for interference measurement in the set, and a channel state information reporting setting identifier; or send, to the terminal, indication information indicating the channel state information reference signal resource set, the resource used for channel measurement and the resource used for interference measurement in the set, and a channel state information reporting setting identifier; or send, to the terminal, indication information indicating the channel and interference hypothesis condition, the channel state information reference signal resource set, and a channel state information reporting setting identifier.

It should be noted that the processing unit 3011 is configured to perform step 100 in the method embodiment shown in FIG. 2 or step 200 in the method embodiment shown in FIG. 5, and the sending unit 3012 is configured to perform step 101 in the method embodiment shown in FIG. 2 or step 201 in the method embodiment shown in FIG. 5. Optionally, the network device may further include a receiving unit that receives CSI-RS reporting reported by the terminal.

Figure 8:
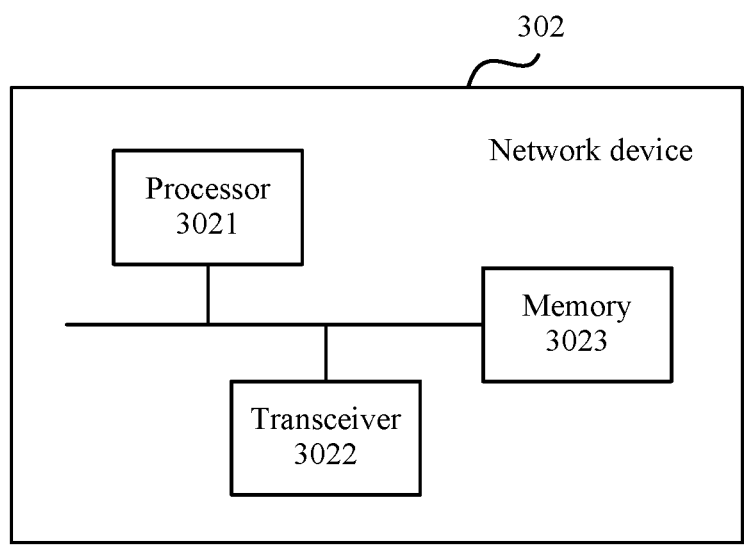
FIG. 8 is a schematic structural diagram of a network device according to an embodiment of this application.

When the processing unit 3011 is a processor, and the sending unit 3012 and the receiving unit are a transceiver, a schematic structural diagram of an entity of the network device is shown in FIG. 8. The network device 302 shown in FIG. 8 includes a processor 3021, a transceiver 3022, and a memory 3023. The processor 3021, the memory 3023, and the transceiver 3022 are connected to each other by using a bus.

The memory 3023 includes but is not limited to a random access memory (RAM), a read-only memory (ROM), an erasable programmable read only memory (EPROM), or a compact disc read-only memory (CD-ROM). The memory 3023 is configured to store a related instruction and related data.

The transceiver 3022 may be a communications module or a transceiver circuit, and is configured to transmit information such as data and signaling between the network device and a terminal device. In this embodiment of the present invention, the transceiver 3022 is configured to send configuration information and indication information, and receive a CSI measurement result, and is specifically configured to perform step 101 in the method embodiment shown in FIG. 2 or perform step 201 in the method embodiment shown in FIG. 5.

The processor 3021 may be a controller, a central processing unit (CPU), a general-purpose processor, a digital signal processor (DSP), an application-specific integrated circuit (ASIC), a field-programmable gate array (FPGA) or another programmable logic device, a transistor logic device, a hardware device, or any combination thereof. The processor 3021 may implement or execute various logic blocks, modules, and circuits that are used as examples and that are described with reference to disclosed content in the embodiments of the present invention. Alternatively, the processor 3021 may be a combination for implementing a computing function, for example, a combination of one or more microprocessors, or a combination of a DSP and a microprocessor. In this embodiment of the present invention, the processor 3021 is configured to configure CSI reporting setting information, resource setting information, resource set setting information, link indication information, and the like. Specifically, the processor 3021 is configured to perform step 100 in the method embodiment shown in FIG. 2 or step 200 in the method embodiment shown in FIG. 5.

Figure 9:
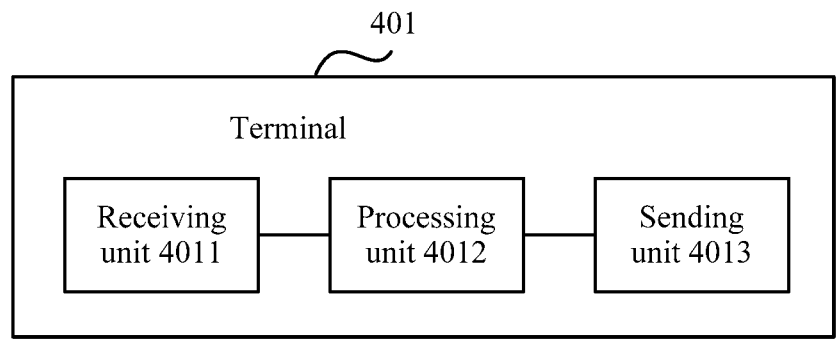
FIG. 9 is a schematic diagram of a terminal according to an embodiment of this application.

Referring to FIG. 9, FIG. 9 is a schematic diagram of a logical structure of a terminal device according to an embodiment of the present invention. The terminal device 401 may include a receiving unit 4011 and a processing unit 4012.

The receiving unit 4011 is configured to receive reference signal measurement indication information sent by a network device, where the indication information is used to indicate a resource set used for channel measurement, and the resource set used for channel measurement includes one or more non-zero power channel state information reference signal resources.

The processing unit 4012 is configured to perform channel measurement by using the non-zero power channel state information reference signal resource in the resource set used for channel measurement and indicated by the indication information.

Optionally, the terminal further includes a sending unit 4013, configured to send a CSI measurement result to the network device. The CSI measurement result includes a CSI report, and one CSI-RS resource set is corresponding to at least one CSI report.

In another implementation, the terminal includes:

the receiving unit 4011, configured to receive reference signal measurement indication information sent by a network device, where the indication information is used to indicate a resource used for channel measurement, and the resource used for channel measurement is one or more non-zero power channel state information reference signal resources; and the processing unit 4012, configured to perform channel measurement by using the resource used for channel measurement and indicated by the indication information.

It should be noted that the processing unit 4012 is configured to perform step 102 in the method embodiment shown in FIG. 2 or step 202 in the method embodiment shown in FIG. 5, and the sending unit 4013 is configured to perform step 103 in the method embodiment shown in FIG. 2 or step 203 in the method embodiment shown in FIG. 5.

During specific implementation, the receiving unit 4011 of the terminal receives a higher layer (RRC layer) setting of the network device. After receiving the indication information, the processing unit 4012 of the terminal parses out a corresponding CSI reporting setting and a corresponding reference signal resource setting. CSI reporting setting information includes a report parameter (a CRI, an RI, a PMI, a CQI, and the like), a frequency-domain granularity (broadband or narrowband) and a time-domain characteristic (periodic, aperiodic, or semi-persistent) of the report parameter, a codebook, a corresponding uplink channel transmission resource, and the like. Reference signal resource setting information includes reference signal resource information used for channel measurement and reference signal resource information used for interference measurement. In an example of reporting a CQI, the processing unit 4012 of the terminal obtains a channel measurement result based on an NZP CSI-RS resource used for channel measurement and indicated by the indication information, to calculate the CQI; and obtains an interference measurement result based on a ZP CSI-RS and/or NZP CSI-RS resource used for interference measurement and indicated by the indication information, to calculate the CQI.

Figure 10:
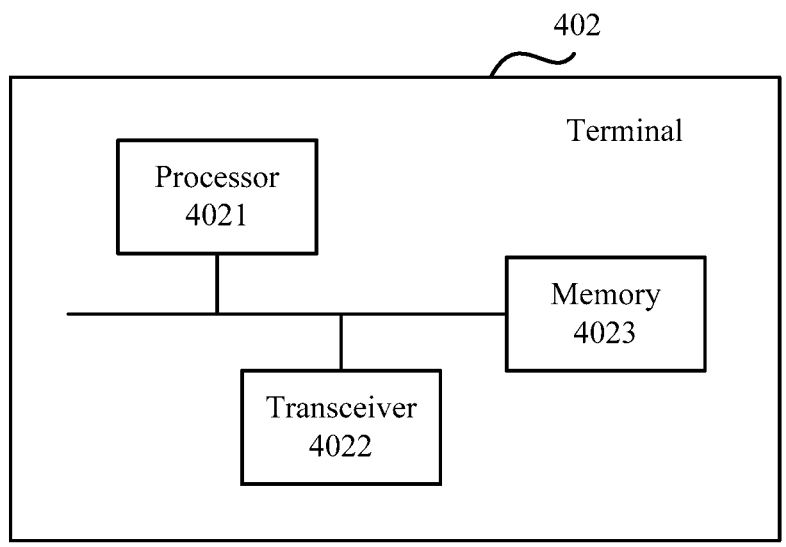
FIG. 10 is a schematic structural diagram of a terminal according to an embodiment of this application.

When the processing unit 4012 is a processor, and the sending unit 4013 and the receiving unit 4011 are a transceiver, a schematic structural diagram of an entity of the terminal is shown in FIG. 10. The terminal device 402 shown in FIG. 10 includes a processor 4021, a transceiver 4022, and a memory 4023. The processor 4021, the memory 4023, and the transceiver 4022 are connected to each other by using a bus.

The memory 4023 includes but is not limited to a RAM, a ROM, an EPROM, or a CD-ROM, and the memory 4023 is configured to store a related instruction and related data.

The transceiver 4022 may be a communications module or a transceiver circuit, and is configured to transmit information such as data and signaling between the terminal device and the network device. In this embodiment of the present invention, the transceiver 4022 is configured to receive setting information and send a CSI measurement result, and is specifically configured to perform step 103 in the method embodiment shown in FIG. 2 or step 203 in the method embodiment shown in FIG. 5.

The processor 4021 may be a controller, a CPU, a general-purpose processor, an ASIC, an FPGA or another programmable logic device, a transistor logic device, a hardware component, or any combination thereof. The processor 4021 may implement or execute various logic blocks, modules, and circuits that are used as examples and that are described with reference to disclosed content in the embodiments of the present invention. Alternatively, the processor 4021 may be a combination for implementing a computing function, for example, a combination of one or more microprocessors, or a combination of a DSP and a microprocessor. In this embodiment of the present invention, the processor 4021 is configured to perform measurement, and is specifically configured to perform step 102 in the method embodiment shown in FIG. 2 or step 202 in the method embodiment shown in FIG. 5.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital video disc (DVD)), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for measuring a channel state information reference signal (CSI-RS), comprising:
   receiving, from a network device, a partial CSI-RS resource sets selected from a plurality of CSI-RS resource sets;
   receiving, from the network device, first indication information indicating one or more resource sets for channel measurement, wherein the one or more resource sets for channel measurement are from the partial CSI-RS resource sets;
   receiving, from the network device, third indication information indicating one or more resource sets for interference measurement, wherein the one or more resource sets for interference measurement are from the partial CSI-RS resource sets; and
   performing at least one of channel measurement by using the one or more resource sets for channel measurement indicated by the first indication information, or interference measurement by using the one or more resource sets for interference measurement indicated by the third indication information;
   wherein the one or more resource sets for channel measurement includes one or more non-zero power CSI-RS resources, and wherein the one or more resource sets for interference measurement includes one or more non-zero power CSI-RS resources.

2. The method according to claim 1, wherein the first indication information indicating one or more resource sets for channel measurement is $\lceil \log N_{s_1} \rceil$ bits wherein the $\lceil \log N_{s_1} \rceil$ bits are used to indicate a resource set in $N_{s_1}$ CSI-RS resource sets for channel measurement from the partial CSI-RS resource sets, and wherein $N_{s_1}$ is a natural number greater than or equal to 1.

3. The method according to claim 1, wherein the first indication information indicates one or more identifiers, each of the identifiers corresponding to one resource set of the one or more resource sets for channel measurement.

4. The method according to claim 1, wherein the third indication information indicates one or more identifiers, each of the identifiers corresponding to one resource set of the one or more resource sets for interference measurement.

5. The method according to claim 1, wherein the third indication information indicating one or more resource sets for interference measurement is $\lceil \log N_{s_1} \rceil$ bits, wherein the $\lceil \log N_{s_1} \rceil$ bits are used to indicate a resource set in $N_{s_1}$ CSI-RS resource sets for interference measurement from the partial CSI-RS resource sets, and wherein $N_{s_1}$ is a natural number greater than or equal to 1.

6. A terminal, comprising:
   at least one processor; and
   a non-transitory computer readable storage medium coupled to the at least one processor and storing a program for execution by the at least one processor to cause the terminal to:
   receive, from a network device, a partial CSI-RS resource sets selected from a plurality of CSI-RS resource sets, and first indication information indicating one or more resource sets for channel measurement, wherein the one or more resource sets for channel measurement are from the partial CSI-RS resource sets;
   receive, from the network device, third indication information indicating one or more resource sets for interference measurement, wherein the one or more resource sets for interference measurement are from the partial CSI-RS resource sets; and
   perform at least one of channel measurement by using the one or more resource sets for channel measurement indicated by the first indication information or interference measurement by using the one or more resource sets for interference measurement indicated by the third indication information;
   wherein the one or more resource sets for channel measurement includes one or more non-zero power CSI-RS resources, and wherein the one or more resource sets for interference measurement includes one or more non-zero power CSI-RS resources.

7. The terminal according to claim 6, wherein the first indication information indicating one or more resource sets for channel measurement is $\lceil \log N_{s_1} \rceil$ bits, wherein the $\lceil \log N_{s_1} \rceil$ bits are used to indicate a resource set in $N_{s_1}$ CSI-RS resource sets for channel measurement from the partial CSI-RS resource sets, and wherein $N_{s_1}$ is a natural number greater than or equal to 1.

8. The terminal according to claim 6, wherein the first indication information indicates one or more identifiers, each of the identifiers corresponding to one resource set of the one or more resource sets for channel measurement.

9. The terminal according to claim 6, wherein the third indication information indicates one or more identifiers, each of the identifiers corresponding to one resource set of the one or more resource sets for interference measurement.

10. The terminal according to claim 6, wherein the third indication information indicating one or more resource sets for channel measurement is $\lceil \log N_{s_1} \rceil$ bits, wherein the $\lceil \log N_{s_1} \rceil$ bits are used to indicate a resource set in $N_{s_1}$ CSI-RS resource sets for interference measurement from the partial CSI-RS resource sets, and wherein $N_{s_1}$ is a natural number greater than or equal to 1.

11. A method for indicating a channel state information reference signal resource (CSI-RS), comprising:
sending, by a network device, a partial CSI-RS resource sets selected from a plurality of CSI-RS resources sets to a terminal;
sending, by the network device, first indication information indicating one or more resource sets for channel measurement, wherein the one or more resource sets for channel measurement are from the partial CSI-RS resource sets;
sending, by the network device, third indication information indicating one or more resource sets for interference measurement, wherein the one or more resource sets for interference measurement are from the partial CSI-RS resource sets;
wherein the one or more resource sets for channel measurement includes one or more non-zero power CSI-RS resources, and wherein the one or more resource sets for interference measurement includes one or more non-zero power CSI-RS resources.

12. The method according to claim 11, wherein the first indication information indicates one or more identifiers, each of the identifiers corresponding to one resource set of the one or more resource sets for channel measurement.

13. The method according to claim 11, wherein the first indication information indicating one or more resource sets for channel measurement is $\lceil \log N_{s_1} \rceil$ bits, wherein the $\lceil \log N_{s_1} \rceil$ bits are used to indicate a resource set in $N_{s_1}$ CSI-RS resource sets for channel measurement from the partial CSI-RS resource sets, and wherein $N_{s_1}$ is a natural number greater than or equal to 1.

14. The method according to claim 11, wherein the third indication information indicates one or more identifiers, each of the identifiers corresponding to one resource set of the one or more resource sets for interference measurement.

15. The method according to claim 11, wherein the third indication information indicating one or more resource sets for interference measurement is $\lceil \log N_{s_1} \rceil$ bits, wherein the $\lceil \log N_{s_1} \rceil$ bits are used to indicate a resource set in $N_{s_1}$ state information reference signal resource sets for interference measurement from the partial CSI-RS resource sets, and wherein $N_{s_1}$ is a natural number greater than or equal to 1.

16. A network device, comprising:
at least one processor; and
a non-transitory computer-readable storage medium coupled to the at least one processor and storing a program for execution by the at least one processor to cause the network device to:
select a partial channel state information reference signal (CSI-RS) resource sets from a plurality of CSI-RS resource sets;
send the partial CSI-RS resource sets;
send first indication information indicating one or more resource sets for channel measurement, wherein the one or more resource sets for channel measurement are from the partial CSI-RS resource sets; and
send third indication information indicating one or more resource sets for interference measurement, wherein the one or more resource sets for interference measurement are from the partial CSI-RS resource sets;
wherein the one or more resource sets for channel measurement includes one or more non-zero power CSI-RS resources, and wherein the one or more resource sets for interference measurement includes one or more non-zero power CSI-RS resources.

17. The network device according to claim 16, wherein the first indication information indicating one or more resource sets for channel measurement is $\lceil \log N_{s_1} \rceil$ bits, wherein the $\lceil \log N_{s_1} \rceil$ bits are used to indicate a resource set in $N_{s_1}$ CSI-RS resource sets for channel measurement from the partial CSI-RS resource sets, and wherein $N_{s_1}$ is a natural number greater than or equal to 1.

18. The network device according to claim 16, wherein the first indication information indicates one or more identifiers, each of the identifiers corresponding to one resource set of the one or more resource sets for channel measurement.

19. The network device according to claim 16, wherein the third indication information indicates one or more identifiers, each of the identifiers corresponding to one resource set of the one or more resource sets for interference measurement.

20. The network device according to claim 16, wherein the third indication information indicating one or more resource sets for interference measurement is $\lceil \log N_{s_1} \rceil$ bits, wherein the $\lceil \log N_{s_1} \rceil$ bits are used to indicate a resource set in $N_{s_1}$ interference state information reference signal resource sets for interference measurement from the partial CSI-RS resource sets, and wherein $N_{s_1}$ is a natural number greater than or equal to 1.

21. A non-transitory computer-readable medium storing a program including instructions that, when executed by at least one processor, causes the at least one processor to:
receive, from a network device, a partial channel state information reference signal (CSI-RS) resource sets selected from a plurality of CSI-RS resource sets;
receive, from the network device, first indication information indicating one or more resource sets for channel measurement, wherein the one or more resource sets for channel measurement are from the partial CSI-RS resource sets;
receive, from the network device, third indication information indicating one or more resource sets for interference measurement, wherein the one or more resource sets for interference measurement are from the partial CSI-RS resource sets; and
perform at least one of channel measurement by using the one or more resource sets for channel measurement indicated by the first indication information, or interference measurement by using the one or more resource sets for interference measurement indicated by the third indication information;
wherein the one or more resource sets for channel measurement includes one or more non-zero power CSI-RS resources, and wherein the one or more resource sets for interference measurement includes one or more non-zero power CSI-RS resources.

22. The non-transitory computer readable medium according to claim 21, wherein the first indication information indicates one or more identifiers, each of the identifiers corresponding to one resource set of the one or more resource sets for channel measurement.

23. The non-transitory computer-readable medium according to claim 21, wherein the third indication information indicates one or more identifiers, each of the identifiers corresponding to one resource set of the one or more resource sets for interference measurement.

24. The non-transitory computer-readable medium according to claim 21, wherein the third indication information indicating one or more resource sets for interference measurement is $\lceil \log N_{s_1} \rceil$ bits, wherein the $\lceil \log N_{s_1} \rceil$ bits are used to indicate a resource set in $N_{s_1}$ CSI-RS resource sets for interference measurement from the partial CSI-RS resource sets, and wherein $N_{s_1}$ is a natural number greater than or equal to 1.

25. The non-transitory computer-readable medium according to claim 21, wherein the first indication information indicating one or more resource sets for channel measurement is $\lceil \log N_{s_1} \rceil$ bits, wherein the $\lceil \log N_{s_1} \rceil$ bits are used to indicate a resource set in $N_{s_1}$ CSI-RS resource sets for channel measurement from the partial CSI-RS resource sets, and wherein $N_{s_1}$ is a natural number greater than or equal to 1.

26. A non-transitory computer-readable medium storing a program including instructions that, when executed by at least one processor, causes the at least one processor to:
 select a partial channel state information reference signal (CSI-RS) resource sets from a plurality of CSI-RS resource sets;
 send the partial CSI-RS resource sets;
 send first indication information indicating one or more resource sets for channel measurement, wherein the one or more resource sets for channel measurement are from the partial CSI-RS resource sets; and
 send third indication information indicating one or more resource sets for interference measurement, wherein the one or more resource sets for interference measurement are from the partial CSI-RS resource sets;
 wherein the one or more resource sets for channel measurement includes one or more non-zero power CSI-RS resources, and wherein the one or more resource sets for interference measurement includes one or more non-zero power CSI-RS resources.

27. The non-transitory computer-readable medium according to claim 26, wherein the first indication information indicating one or more resource sets for channel measurement is $\lceil \log N_{s_1} \rceil$ bits, wherein the $\lceil \log N_{s_1} \rceil$ bits are used to indicate a resource set in $N_{s_1}$ CSI-RS resource sets for channel measurement from the partial CSI-RS resource sets, and wherein $N_{s_1}$ is a natural number greater than or equal to 1.

28. The non-transitory computer-readable medium according to claim 26, wherein the first indication information indicates one or more identifiers, each of the identifiers corresponding to one resource set of the one or more resource sets for channel measurement.

29. The non-transitory computer-readable medium according to claim 26, wherein the third indication information indicates one or more identifiers, each of the identifiers corresponding to one resource set of the one or more resource sets for interference measurement.

30. The non-transitory computer-readable medium according to claim 26, wherein the third indication information indicating one or more resource sets for interference measurement is $\lceil \log N_{s_1} \rceil$ bits, wherein the $\lceil \log N_{s_1} \rceil$ bits are used to indicate a resource set in $N_{s_1}$ interference state information reference signal resource sets for interference measurement from the partial CSI-RS resource sets, and wherein $N_{s_1}$ is a natural number greater than or equal to 1.

* * * * *